(12) United States Patent
Ryu et al.

(10) Patent No.: US 11,050,593 B1
(45) Date of Patent: Jun. 29, 2021

(54) SYNCHRONIZATION APPARATUS AND METHOD FOR UPSTREAM SYSTEM

(71) Applicant: ELECTRONICS AND TELECOMMUNICATIONS RESEARCH INSTITUTE, Daejeon (KR)

(72) Inventors: Kwan-Woong Ryu, Daejeon (KR); Jin-Hyuk Song, Daejeon (KR); Joon-Young Jung, Daejeon (KR); Dong-Joon Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/866,007

(22) Filed: May 4, 2020

(30) Foreign Application Priority Data

Jan. 6, 2020 (KR) .......................... 10-2020-0001527

(51) Int. Cl.
*H04L 25/02* (2006.01)
*H04L 27/26* (2006.01)
*H04L 27/00* (2006.01)
*H04L 25/03* (2006.01)

(52) U.S. Cl.
CPC ...... *H04L 27/0014* (2013.01); *H04L 25/0232* (2013.01); *H04L 27/2659* (2013.01); *H04L 27/2662* (2013.01); *H04L 27/2675* (2013.01); *H04L 27/2695* (2013.01); *H04L 2025/03796* (2013.01); *H04L 2027/0026* (2013.01)

(58) Field of Classification Search
CPC ............. H04L 27/2695; H04L 25/0232; H04L 25/023; H04L 25/0228; H04L 25/0224; H04L 27/0014; H04L 27/2675; H04L 27/2659; H04L 27/2662
See application file for complete search history.

(56) References Cited

U.S. PATENT DOCUMENTS

| 7,308,033 | B2 | 12/2007 | Yu et al. |
| 7,349,447 | B1 | 3/2008 | Sung et al. |
| 7,889,799 | B2 * | 2/2011 | Guey ................. H04L 25/0228 375/260 |
| 10,291,422 | B2 | 5/2019 | Choi et al. |
| 2014/0341326 | A1 * | 11/2014 | Choi ................... H04L 25/0232 375/350 |
| 2015/0201422 | A1 | 7/2015 | Jin |

FOREIGN PATENT DOCUMENTS

| CN | 101313488 | 12/2011 |
| EP | 1 892 847 | 10/2010 |
| KR | 10-1302201 | 8/2013 |
| KR | 10-2018-0058621 | 6/2018 |

* cited by examiner

*Primary Examiner* — Betsy Deppe
(74) *Attorney, Agent, or Firm* — Kile Park Reed & Houtteman PLLC

(57) ABSTRACT

Disclosed herein are a synchronization apparatus and method for a upstream system. The synchronization apparatus for a upstream system includes one or more processors, and execution memory for storing at least one program that is executed by the one or more processors, wherein the at least one program is configured to receive a signal and calculate a first channel estimation value for the received signal using a predefined pilot, and calculate a second channel estimation value using a predefined complementary pilot and the first channel estimation value.

8 Claims, 33 Drawing Sheets

SYNCHRONIZATION APPARATUS AND METHOD FOR UPSTREAM SYSTEM

CROSS REFERENCE TO RELATED APPLICATION

This application claims the benefit of Korean Patent Application No. 10-2020-0001527, filed Jan. 6, 2020, which is hereby incorporated by reference in its entirety into this application.

BACKGROUND OF THE INVENTION

1. Technical Field

The present invention relates generally to cable transmission/reception and communication technology, and more particularly, to synchronization technology for correcting a Carrier Frequency Offset (CFO) and a sampling clock offset, which occur in a Data Over Cable Service Interface Specification (DOCSIS) 3.1 upstream system.

2. Description of the Related Art

In order to respond to the insufficiency of a transmission band attributable to increased demand for implementation of high-definition broadcasting service and ultra-high-speed Internet service and intensification in media competition attributable to fiber-to-the-home (FTTH)-based Gigabit-level service, DOCSIS 3.1 transmission specifications have been presented. DOCSIS 3.1 refers to technology that enables 10 Gbps-level transmission, which was considered to be possible only when optical cables are installed on a subscriber's premises, to be realized over existing cable broadcasting networks.

Among these technologies, a DOCSIS 3.1 upstream system uses an Orthogonal Frequency-Division Multiple Access (OFDMA) frame while aiming at a speed of 1 Gbps or more, and has a transmission unit which is a transmission burst composed of multiple minislots. Here, each minislot is composed of multiple sub-carrier groups, and all sub-carriers in each minislot have the same modulation order. A cable modem (CM) is assigned one or more minislots for a transmission burst through a transmission profile, and acquires information about a modulation order and a pilot pattern. The transmission profile defines the modulation order and the pilot pattern of the corresponding minislot on a transmission burst basis.

Meanwhile, Korean Patent Application Publication No. 10-2018-0058621 entitled "Apparatus of Synchronization for DOCSIS Upstream Signal Transmission through Optical-Based IP Network and Method of the Same" discloses an apparatus and method for transmitting a DOCSIS-based upstream signal, used in cable broadcasting over an optical-based IP network, in synchronization with a DOCSIS network.

SUMMARY OF THE INVENTION

Accordingly, the present invention has been made keeping in mind the above problems occurring in the prior art, and an object of the present invention is to provide synchronization and channel equalization efficient for a DOCSIS 3.1 upstream system.

Another object of the present invention is to effectively eliminate frequency and phase offsets attributable to the sampling clock offset of the DOCSIS 3.1 upstream system.

In accordance with an aspect of the present invention to accomplish the above objects, there is provided a synchronization apparatus for a upstream system, including one or more processors, and an execution memory for storing at least one program that is executed by the one or more processors, wherein the at least one program is configured to receive a signal and calculate a first channel estimation value for the received signal using a predefined pilot, and calculate a second channel estimation value using a predefined complementary pilot and the first channel estimation value.

The at least one program may be configured to extract a compensation parameter from a preset symbol range in a symbol constellation from which the predefined complementary pilot is extracted.

The at least one program may be configured to extract respective compensation parameters for at least two complementary pilots from preset symbol ranges in symbol constellations of the at least two complementary pilots.

The at least one program may be configured to compensate for an error in the complementary pilot using the compensation parameter.

The at least one program may be configured to calculate the second channel estimation value using an error-compensated complementary pilot, the predefined pilot, and the first channel estimation value, and to perform channel equalization based on the second channel estimation value.

In accordance with another aspect of the present invention to accomplish the above objects, there is provided a synchronization method for a upstream system, the synchronization method being performed using a synchronization apparatus for the upstream system, the synchronization method including receiving a signal and calculating a first channel estimation value for the received signal using a predefined pilot, and calculating a second channel estimation value using a predefined complementary pilot and the first channel estimation value.

Calculating the second channel estimation value may be configured to extract a compensation parameter from a preset symbol range in a symbol constellation from which the predefined complementary pilot is extracted.

Calculating the second channel estimation value may be configured to extract respective compensation parameters for at least two complementary pilots from preset symbol ranges in symbol constellations of the at least two complementary pilots.

Calculating the second channel estimation value may be configured to compensate for an error in the complementary pilots using the compensation parameters.

Calculating the second channel estimation value may be configured to calculate the second channel estimation value using error-compensated complementary pilots, the predefined pilot, and the first channel estimation value, and to perform channel equalization based on the second channel estimation value.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
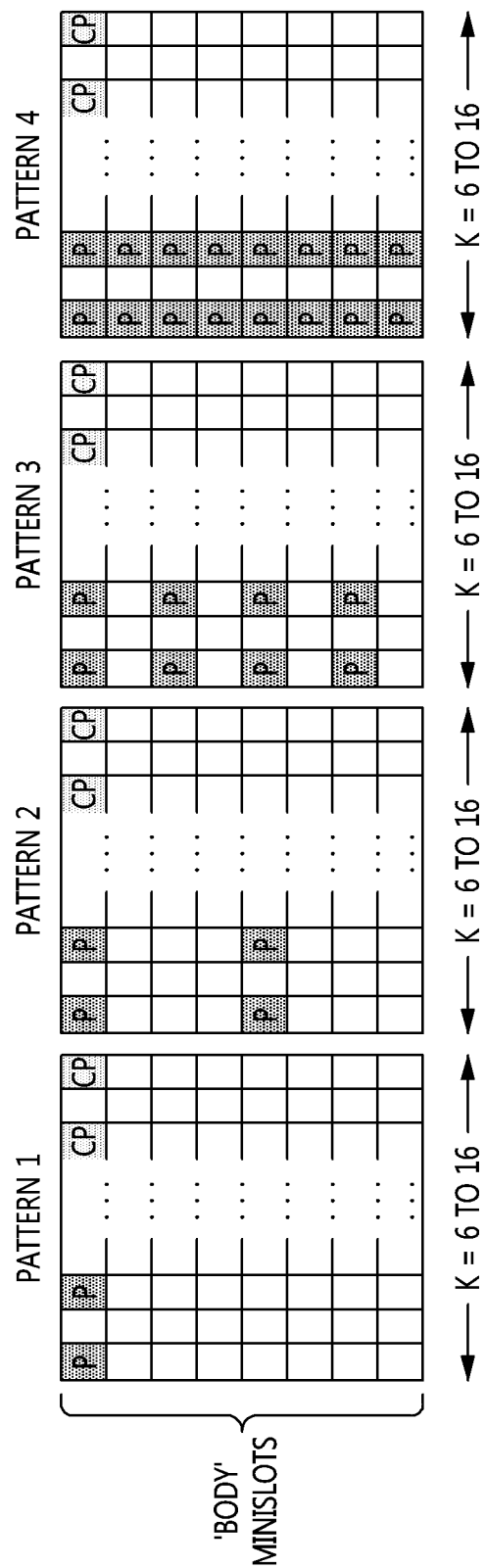
FIGS. 1 and 2 are diagrams illustrating a pilot pattern (2K mode) of a DOCSIS 3.1 upstream system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with reference to the attached drawings.

Figure 2:
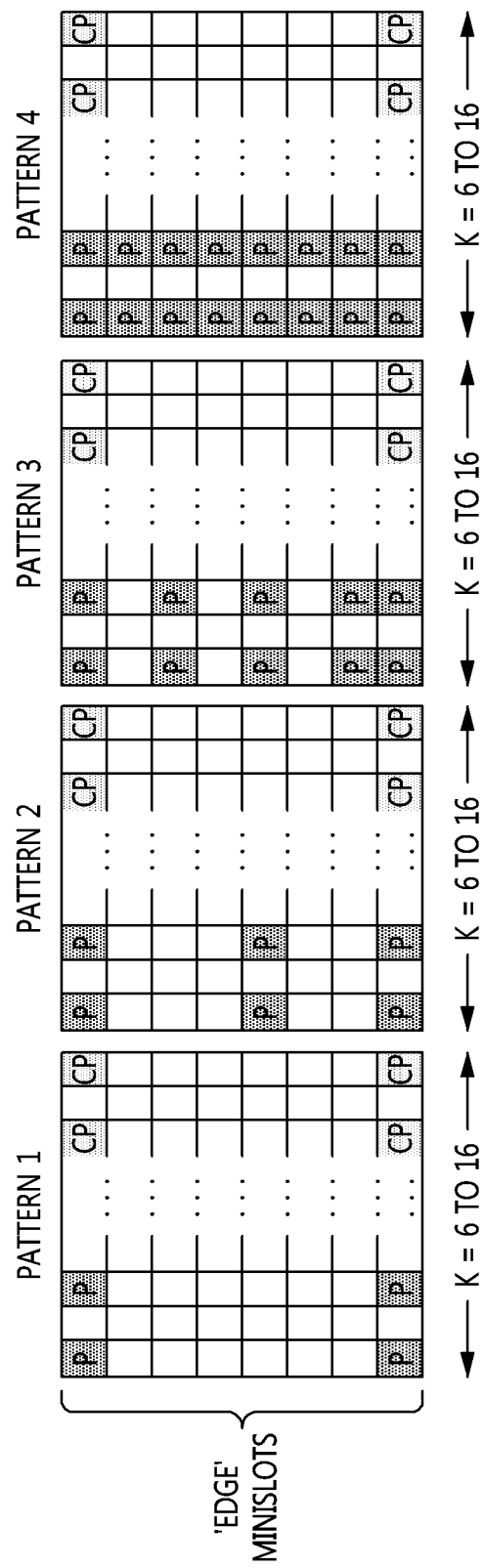
Figure 3:
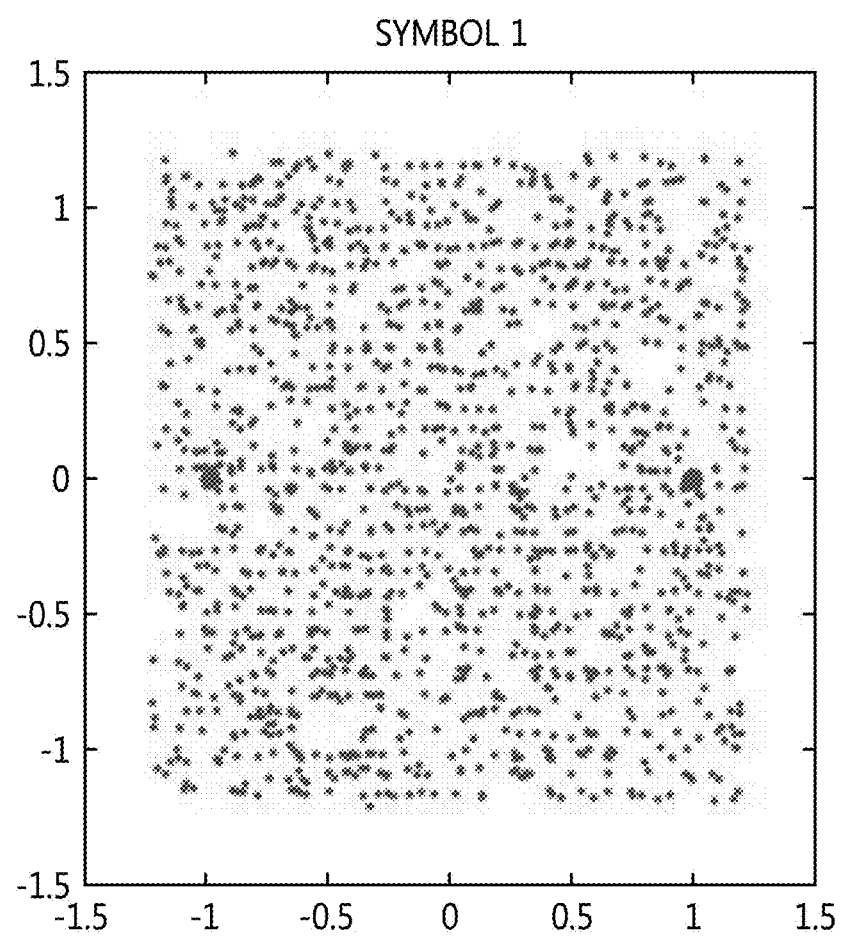
FIGS. 3 to 10 are constellations illustrating the results of performing channel equalization using pilots according to an embodiment of the present invention.
Figure 4:
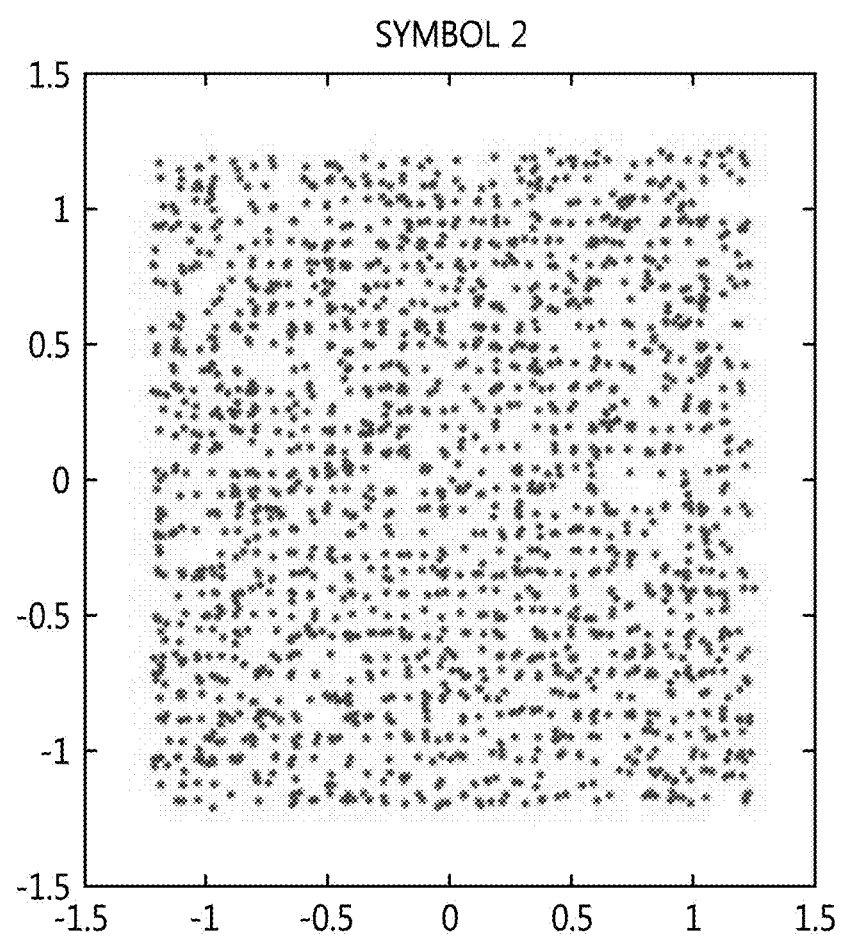
Figure 5:
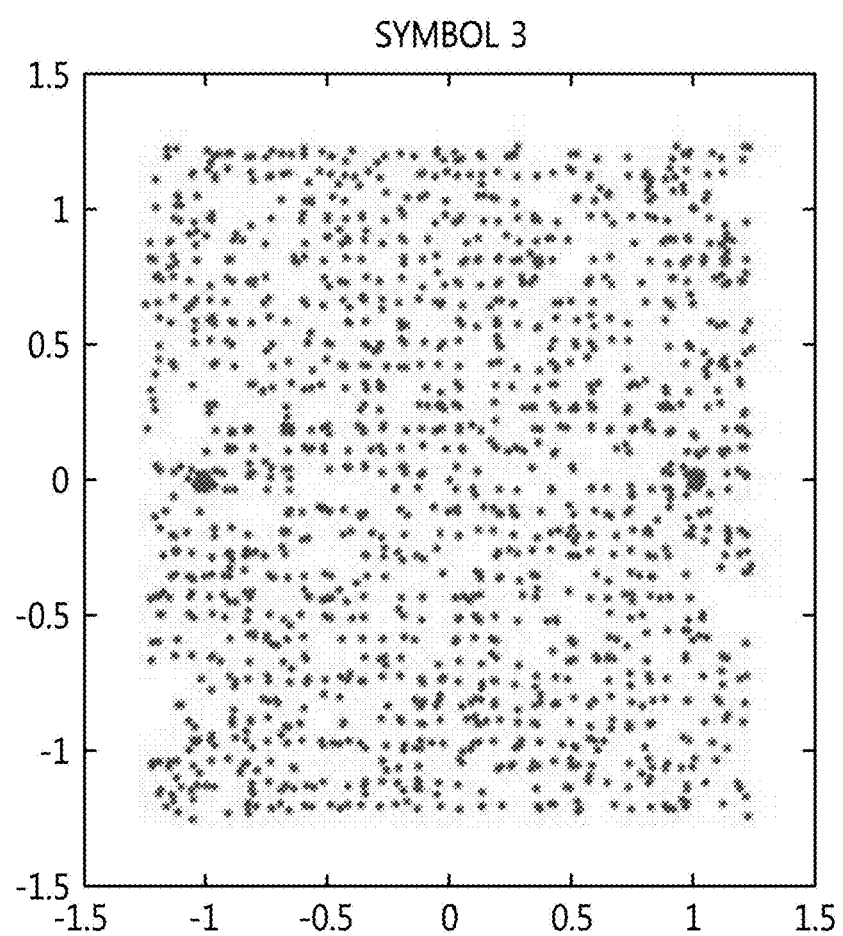
Figure 6:
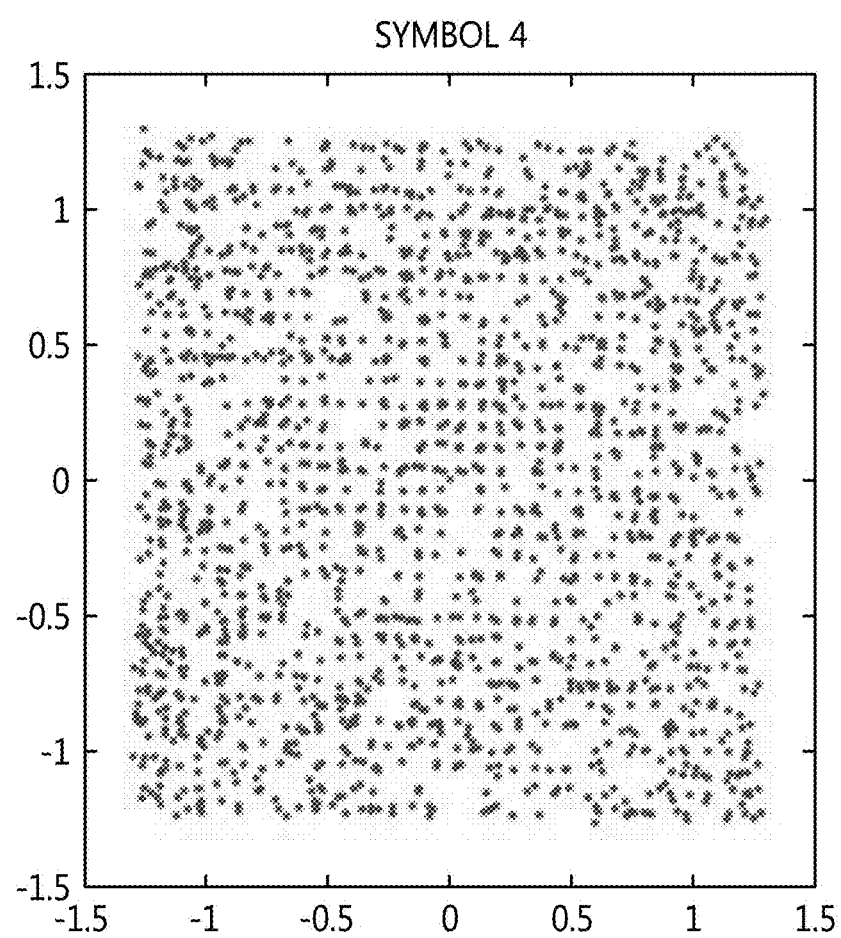
Figure 7:
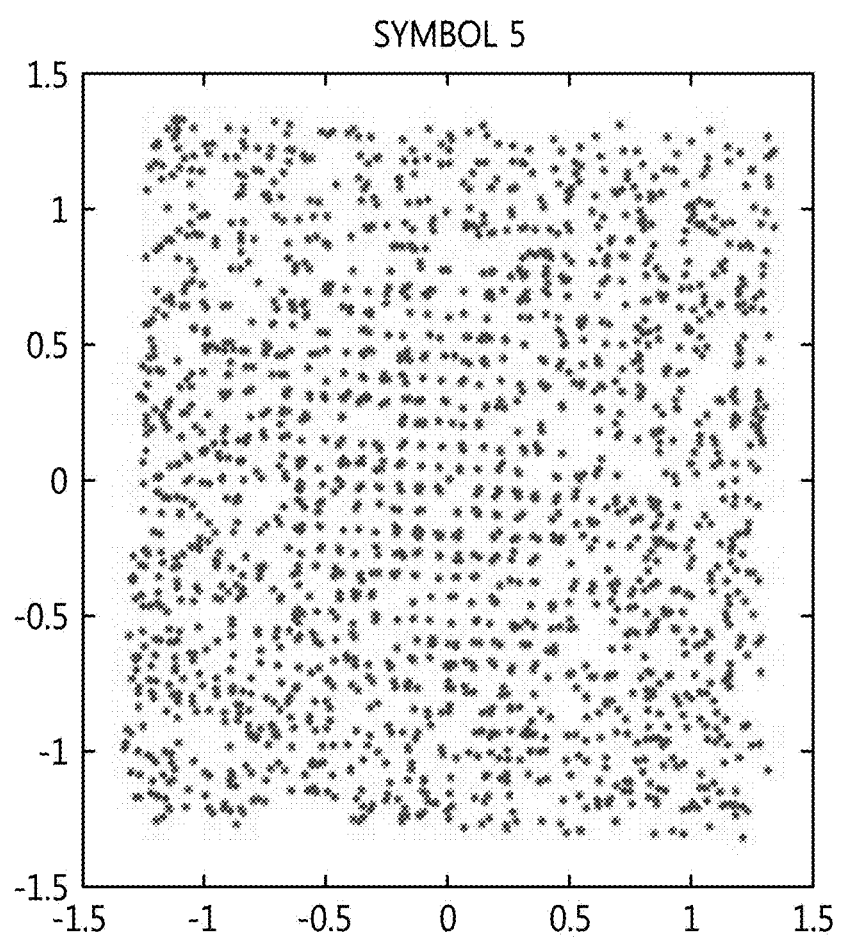
Figure 8:
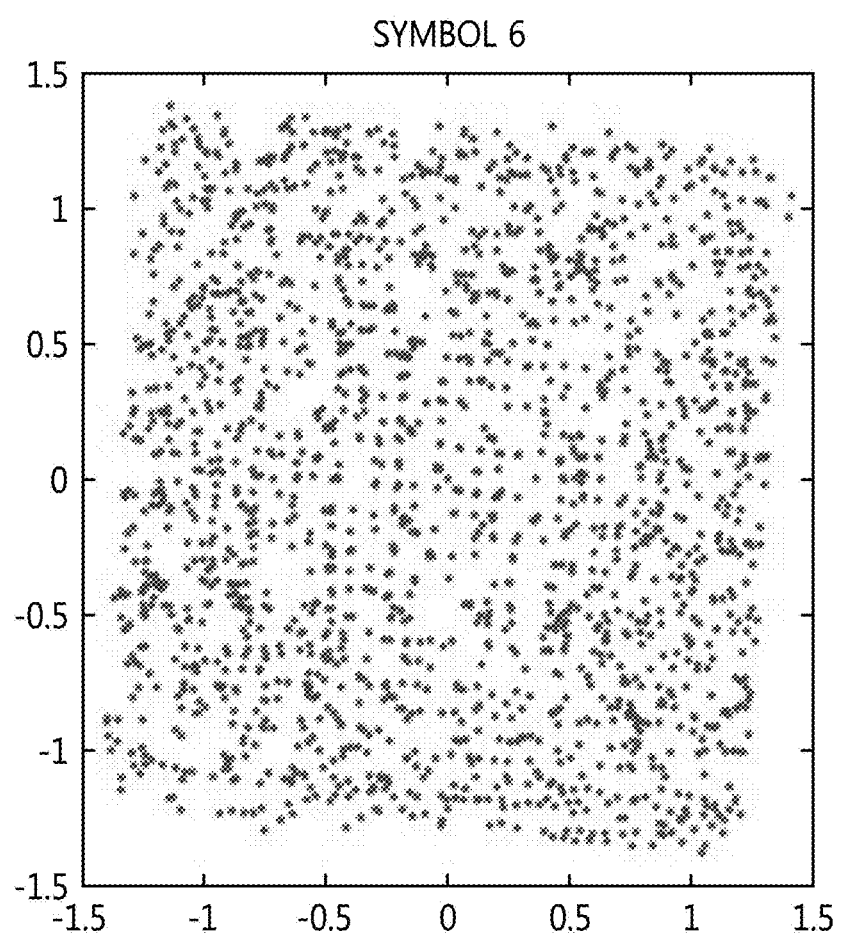
Figure 9:
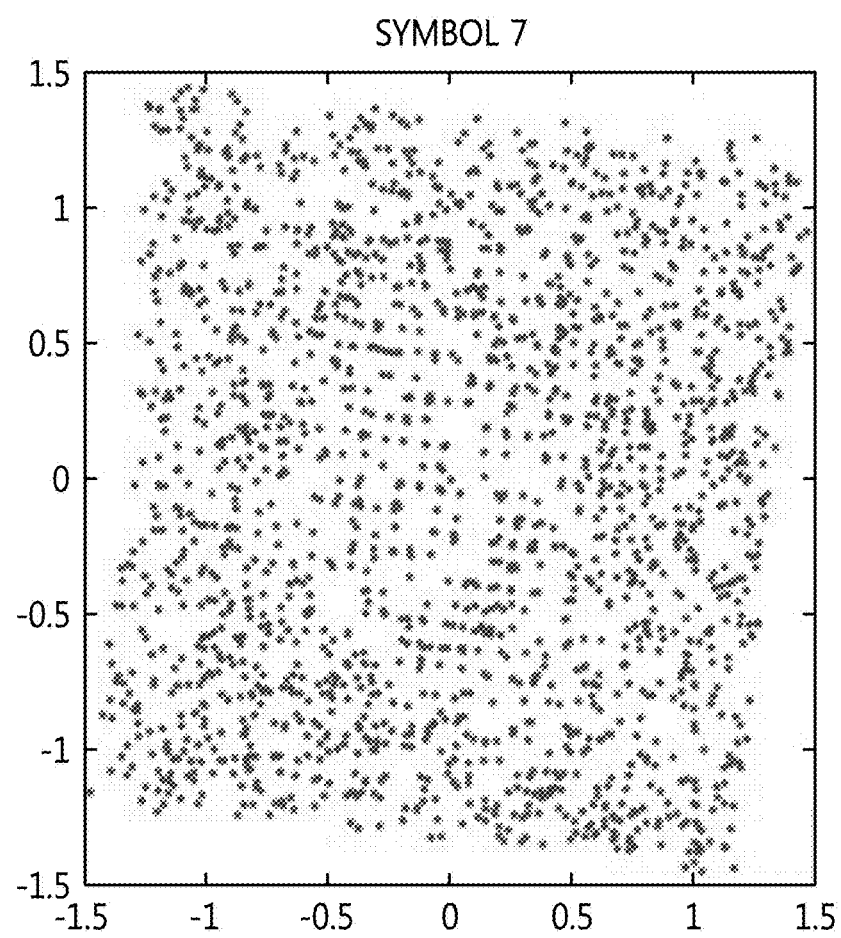
Figure 10:
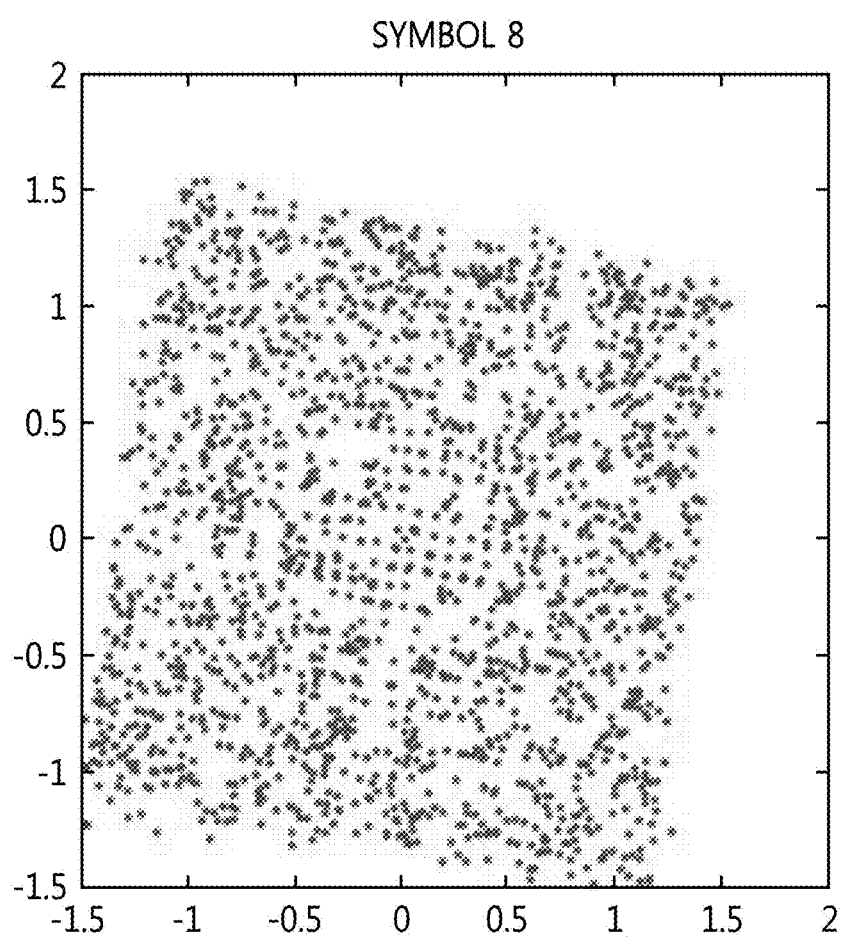

FIGS. 1 and 2 are diagrams illustrating a pilot pattern (2K mode) of a DOCSIS 3.1 upstream system (or a DOCSIS upstream system) according to an embodiment of the present invention.

Referring to FIGS. 1 and 2, it can be seen that pilot patterns 1 to 4 for the DOCSIS 3.1 upstream system are depicted. In a DOCSIS 3.1 upstream frame according to an embodiment of the present invention, pilots may be scattered in first and third symbols of a frame, and complementary pilots may be scattered in symbols located at first and third locations from an end symbol. Here, each of the pilots may be a Binary Phase-Shift Keying (BPSK) symbol of 1 or −1, which is agreed upon between a transmitter and a receiver. Unlike the pilots, each of the complementary pilots may transmit data other than symbols agreed upon between the transmitter and the receiver. The complementary pilot may correspond to a data subcarrier having a modulation order lower than that of other data subcarriers in a minislot. If the modulation order used in other data subcarriers in the minislot is M, a complementary pilot may use '1' (BPSK) in a modulation order of M-4.

In the pilot structure of the DOCSIS 3.1 upstream system according to the embodiment of the present invention, when only pilots are used for channel equalization and the correction of a Carrier Frequency Offset (CFO), compensation for a sampling clock offset and a CFO and channel equalization are desirably performed in low-order symbols in which the pilots are present, but degradation of performance may occur in high-order symbols in which pilots are not present.

FIGS. 3 to 10 are constellations illustrating the results of performing channel equalization using pilots according to an embodiment of the present invention.

Referring to FIGS. 3 to 10, it can be seen that an embodiment in which only pilots are used for channel equalization and CFO correction when data symbols are 1024-Quadrature amplitude modulation (QAM) symbols and complementary pilot symbols are 64-QAM symbols is illustrated. When synchronization is performed using only pilots, it can be seen that compensation for a sampling clock offset and a CFO and channel equalization are desirably realized in low-order symbols (symbol 1 to symbol 3) in which pilots are present, but degradation of performance may occur in high-order symbols (symbol 4 to symbol 8) in which pilots are not present, as illustrated in FIGS. 3 to 10. Such performance degradation may be more severe as the difference between frequency offsets in the transmitter and the receiver (or transmission and reception stages) is larger.

Figure 11:
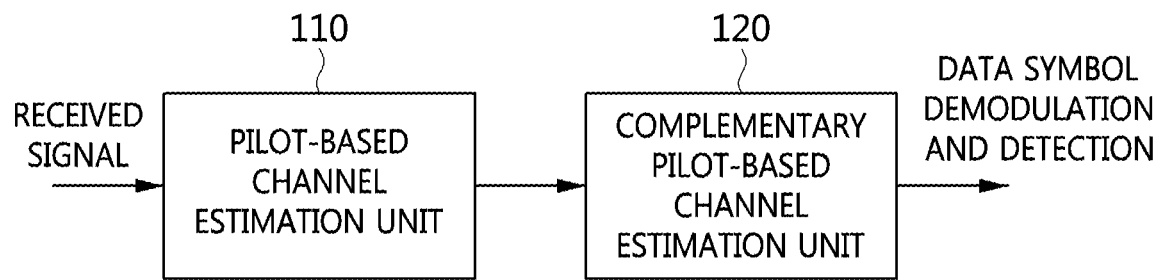
FIG. 11 is a block diagram illustrating a synchronization apparatus for a upstream system according to an embodiment of the present invention.
Figure 12:
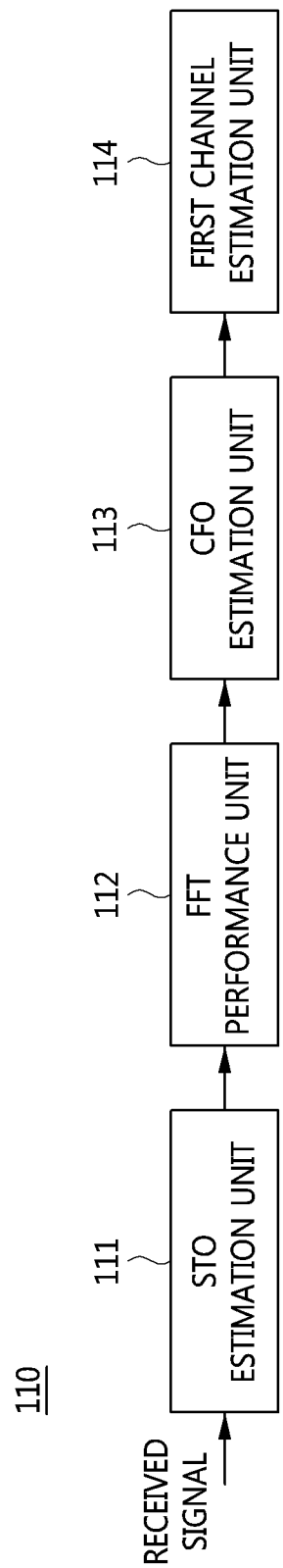
FIG. 12 is a block diagram illustrating in detail an example of the pilot-based channel estimation unit illustrated in FIG. 11.
Figure 13:
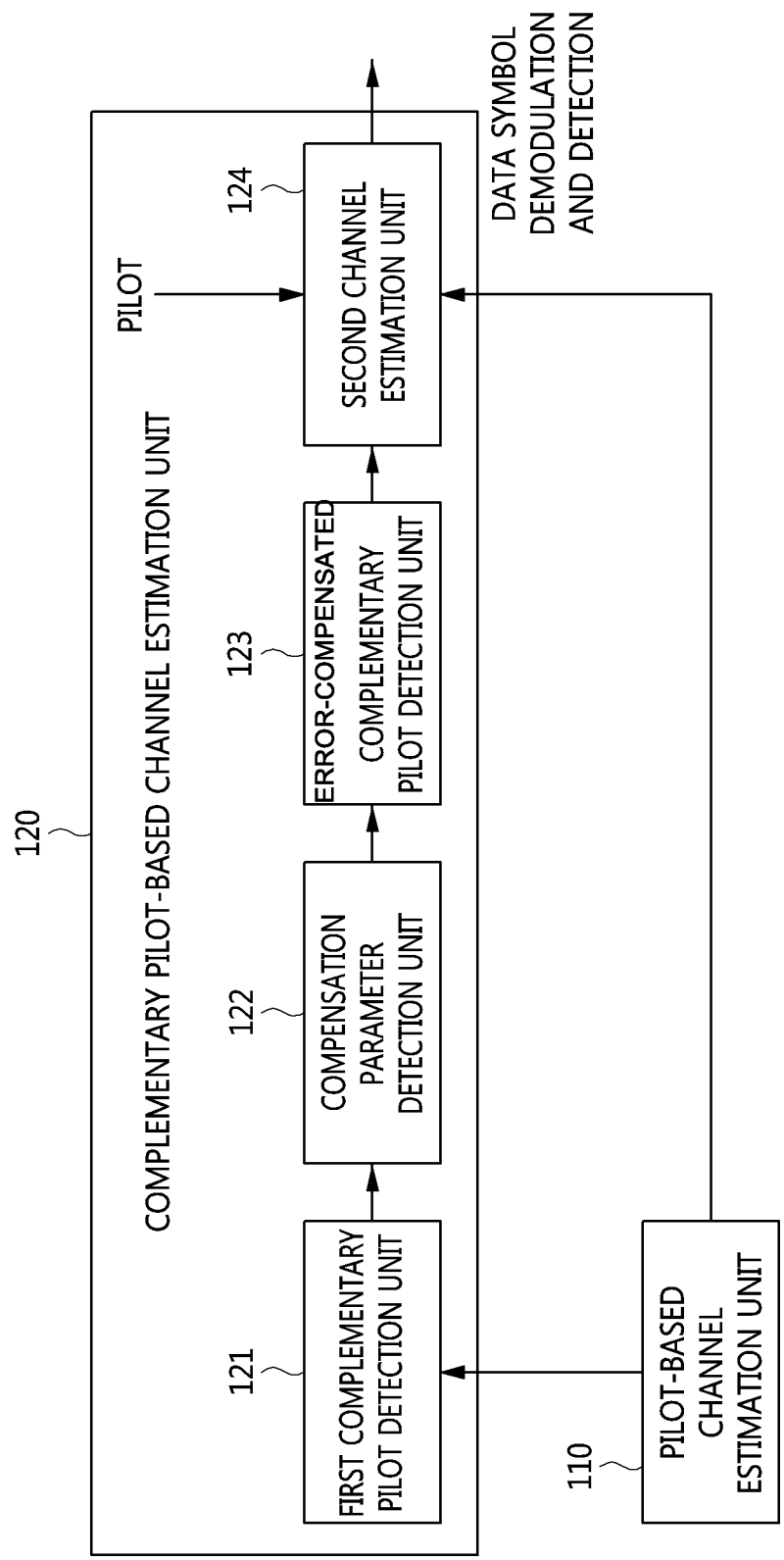
FIG. 13 is a block diagram illustrating in detail an example of the complementary pilot-based channel estimation unit illustrated in FIG. 11.

FIG. 11 is a block diagram illustrating a synchronization apparatus for a upstream system according to an embodiment of the present invention. FIG. 12 is a block diagram illustrating in detail an example of the pilot-based channel estimation unit illustrated in FIG. 11. FIG. 13 is a block diagram illustrating in detail an example of the complementary pilot-based channel estimation unit illustrated in FIG. 11.

Referring to FIG. 11, the synchronization apparatus for the upstream system according to the embodiment of the present invention includes a pilot-based channel estimation unit 110 and a complementary pilot-based channel estimation unit 120.

The pilot-based channel estimation unit 110 may receive a signal, and may calculate a first channel estimation value for the received signal using predefined pilots.

Referring to FIG. 12, the pilot-based channel estimation unit 110 may include a Symbol Timing Offset (STO) estimation unit 111, a Fast Fourier Transform (FFT) performance unit 112, a Carrier Frequency Offset (CFO) estimation unit 113, and a first channel estimation unit 114.

The STO estimation unit 111 may estimate a Symbol Timing Offset (STO) in the time domain of the received signal.

The FFT performance unit 112 may estimate a frequency offset after performing a Fast Fourier Transform (FFT) on the received signal.

The CFO estimation unit 113 may compensate for a Carrier Frequency Offset (CFO) in a frequency domain.

Here, the CFO estimation unit 113 may calculate the amount of frequency angular rotation between symbols in the frequency domain using the following Equation (1):

$$\Delta\phi = \angle[(P_1)^* \times P3]/N \qquad (1)$$

Here, $P_1$ denotes N pilot symbol vectors in a first symbol, and P3 denotes N pilot symbol vectors in a third symbol.

The CFO estimation unit 113 may apply the amount of frequency angular rotation between the symbols, calculated in Equation (1), to eight symbols, as represented by the following Equation (2):

$$\hat{S}_k = S_k \times \exp(-j \times k \times \Delta\phi) \qquad (2)$$

Here, k of $S_k$ denotes a k-th symbol.

The first channel estimation unit 114 may obtain the average of channel gains using P1 and P3 pilots and apply the average to the eight symbols in the time domain, and may interpolate the channel gains, calculated in the time domain, and apply the interpolated value to the frequency domain.

The complementary pilot-based channel estimation unit 120 may calculate a second channel estimation value using predefined complementary pilots and the first channel estimation value.

Referring to FIG. 13, the complementary pilot-based channel estimation unit 120 may include a first complementary pilot detection unit 121, a compensation parameter detection unit 122, a second complementary pilot detection unit 123, and a second channel estimation unit 124.

The first complementary pilot detection unit 121 may detect predefined complementary pilots.

For example, in the constellations of a sixth symbol and an eighth symbol, 1024-QAM data symbols and 64-QAM complementary pilot symbols may coexist.

Here, the first complementary pilot detection unit 121 may extract only 64-QAM complementary pilot symbols in the sixth symbol and the eighth symbol from input complementary pilot symbols.

The compensation parameter detection unit 122 may extract compensation parameters from preset symbol ranges in symbol constellations from which the predefined complementary pilot symbols are extracted.

The extracted complementary pilot symbols may exhibit a remarkably high error rate in high-order symbols.

Here, the compensation parameter detection unit 122 may extract respective compensation parameters for at least two complementary pilots from preset symbol ranges in the symbol constellations of at least two complementary pilots.

Here, in order to correct this error rate, the compensation parameter detection unit 122 may set low-power symbol ranges (see rectangular ranges in FIGS. 20 and 21) in which errors do not occur in the constellations of the sixth symbol and the eighth symbol, and may extract compensation parameters based on the set symbol ranges. The complementary pilot detection values $\hat{s}_{cp}$ may be represented by the following Equation (3):

$$\hat{s}_{cp} = |\tilde{s}_{cp} - s_{cp}|_{min} \qquad (3)$$

Here, $\tilde{s}_{cp}$ denotes sixth and eighth complementary pilot values after first-step channel estimation and channel equalization have been performed, and may be represented by $\tilde{s}_{cp} = r_{cp}/\hat{h}_{cp}$, wherein $r_{cp}$ denotes a complementary pilot value that is input after CFO estimation and compensation have been performed, and $\hat{h}_{cp}$ denotes an estimated channel value at the location of the corresponding complementary pilot.

Here, the compensation parameter detection unit 122 may select only complementary pilot symbols falling within a range (x) having a predetermined size.

Here, the compensation parameter detection unit 122 may set the range in which errors do not occur in each of the constellations of the sixth and eighth symbols to a range of [x<c].

For example, the compensation parameter detection unit 122 may set the range to a range of [x<0.6].

In the range of [x<0.6], each complementary pilot detection value $\hat{s}_{cp}$ matches a transmitted complementary pilot value $s_{cp}$ without causing a symbol error. The compensation parameters may be represented by the following Equation (4):

$$\hat{g}_{cp} = \frac{\tilde{s}_{cp[x<0.6]}}{\hat{s}_{cp[x<0.6]}} = \frac{\tilde{s}_{cp[x<0.6]}}{s_{cp[x<0.6]}}. \qquad (4)$$

The second complementary pilot detection unit 123 may compensate for errors in the complementary pilots using the compensation parameters, and may detect error-compensated complementary pilots.

The complementary pilot values $\tilde{\tilde{s}}_{cp}$, which are error-compensated using the compensation parameters, may be represented by the following Equation (5):

$$\tilde{\tilde{s}}_{cp} = \frac{\tilde{s}_{cp}}{\hat{g}_{cp}}. \qquad (5)$$

Here, when the second complementary pilot detection unit 123 detects again complementary pilots after the application of the compensation parameters, the error rate of the complementary pilots in the sixth and eighth symbols may be '0'.

The complementary pilot error rate of '0' may mean that the sixth and eighth complementary pilots can be used as known signals (i.e., signals agreed upon between transmission and reception stages), such as pilots.

The second channel estimation unit 124 may calculate the second channel estimation value using the error-compensated complementary pilots, the predefined pilots, and the first channel estimation value, and may perform channel equalization based on the second channel estimation value.

Figure 14:
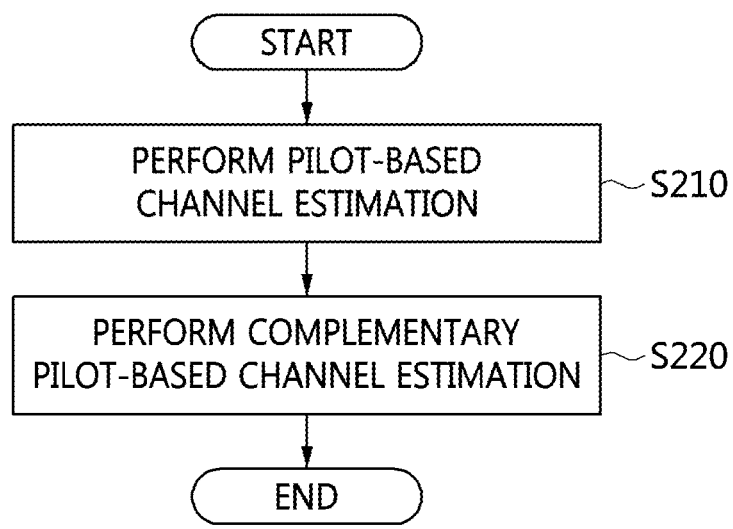
FIG. 14 is an operation flowchart illustrating a synchronization method for a upstream system according to an embodiment of the present invention.
Figure 15:
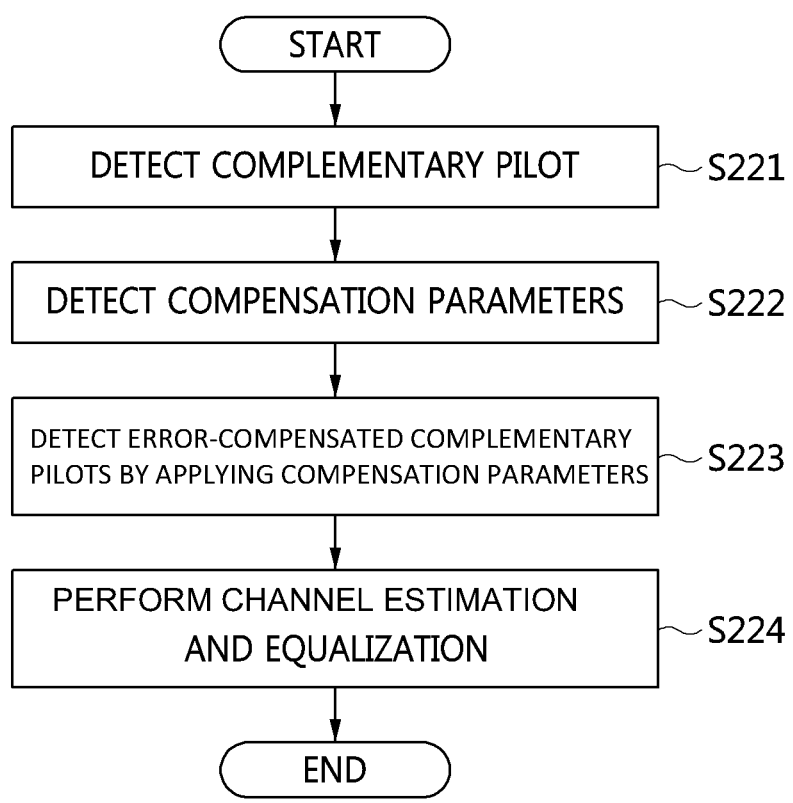
FIG. 15 is an operation flowchart illustrating in detail an example of the complementary pilot-based channel estimation step illustrated in FIG. 14.

FIG. 14 is an operation flowchart illustrating a synchronization method for a upstream system according to an embodiment of the present invention. FIG. 15 is an operation flowchart illustrating in detail an example of the complementary pilot-based channel estimation step illustrated in FIG. 14.

Referring to FIG. 14, the synchronization method for a upstream system according to the embodiment of the present invention may perform pilot-based channel estimation at step S210.

That is, at step S210, a signal may be received, and a first channel estimation value for the received signal may be calculated using predefined pilots.

At step S210, in the time domain of the received signal, a Symbol Timing Offset (STO) may be estimated.

Here, at step S210, after a FFT has been performed on the received signal, a frequency offset may be estimated.

In detail, at step S210, a Carrier Frequency Offset (CFO) in the frequency domain may be compensated for.

Here, at step S210, the amount of frequency angular rotation between symbols in the frequency domain may be calculated using the above-described Equation (1).

At step S210, the amount of frequency angular rotation between the symbols, calculated in Equation (1), may be applied to eighth symbols, as represented by the above-described Equation (2).

In this case, at step S210, the average of channel gains using P1 and P3 pilots may be obtained and applied to the eight symbols in the time domain. Also, the channel gains, calculated in the time domain, may be interpolated, and the interpolated value may be applied to the frequency domain.

Next, the synchronization method for the upstream system according to the embodiment of the present invention may perform complementary pilot-based channel estimation at step S220.

That is, at step S220, a second channel estimation value may be calculated using predefined complementary pilots and the first channel estimation value.

Referring to FIG. 15, in the procedure at step S220, complementary pilots may be detected at step S221.

That is, at step S221, the predefined complementary pilots may be detected.

For example, in the constellations of a sixth symbol and an eighth symbol, 1024-QAM data symbols and 64-QAM complementary pilot symbols may coexist.

Here, at step S221, only 64-QAM complementary pilot symbols in the sixth symbol and the eighth symbol may be extracted from input complementary pilot symbols.

Further, in the procedure at step S220, compensation parameters may be detected at step S222.

That is, at step S222, compensation parameters may be extracted from preset symbol ranges in symbol constellations from which the predefined complementary pilot symbols are extracted.

The extracted complementary pilot symbols may exhibit a remarkably high error rate in high-order symbols.

Here, at step S222, respective compensation parameters for at least two complementary pilots may be extracted from preset symbol ranges in the symbol constellations of at least two complementary pilots.

In detail, at step S222, in order to correct this error rate, low-power symbol ranges (see blue rectangular ranges in FIGS. 20 and 21) in which errors do not occur in the constellations of the sixth symbol and the eighth symbol may be set, and compensation parameters may be extracted based on the set symbol ranges. The complementary pilot detection values $\hat{s}_{cp}$ may be represented by the above-described Equation (3).

At step S222, only complementary pilot symbols falling within a range (x) having a predetermined size may be selected.

Here, at step S222, the range in which errors do not occur in each of the constellations of the sixth and eighth symbols may be set to a range of [x<c].

For example, at step S222, the range may be set to a range of [x<0.6].

In the range of [x<0.6], each complementary pilot detection value $\hat{s}_{cp}$ matches a transmitted complementary pilot value $s_{cp}$ without causing a symbol error. The compensation parameters may be represented by the above-described Equation (4).

Further, in the procedure at step S220, the complementary pilots may be detected by applying the compensation parameters at step S223.

In detail, at step S223, errors in the complementary pilots may be compensated for using the compensation parameters, and error-compensated complementary pilots may be detected.

The complementary pilot values $\tilde{s}_{cp}$, which are error-compensated using the compensation parameters, may be represented by the above-described Equation (5).

Here, at step S223, when complementary pilots are detected again after the application of the compensation parameters, the error rate of the complementary pilots in the sixth and eighth symbols may be '0'

The complementary pilot error rate of '0' may mean that the sixth and eighth complementary pilots can be used as known signals (i.e., signals agreed upon between transmission and reception stages), such as pilots.

Furthermore, in the procedure at step S220, channel estimation and equalization may be performed using the error-compensated complementary pilots at step S224.

That is, at step S224, the second channel estimation value may be calculated using the error-compensated complementary pilots, the predefined pilots, and the first channel estimation value, and channel equalization may be performed based on the second channel estimation value.

Figure 16:
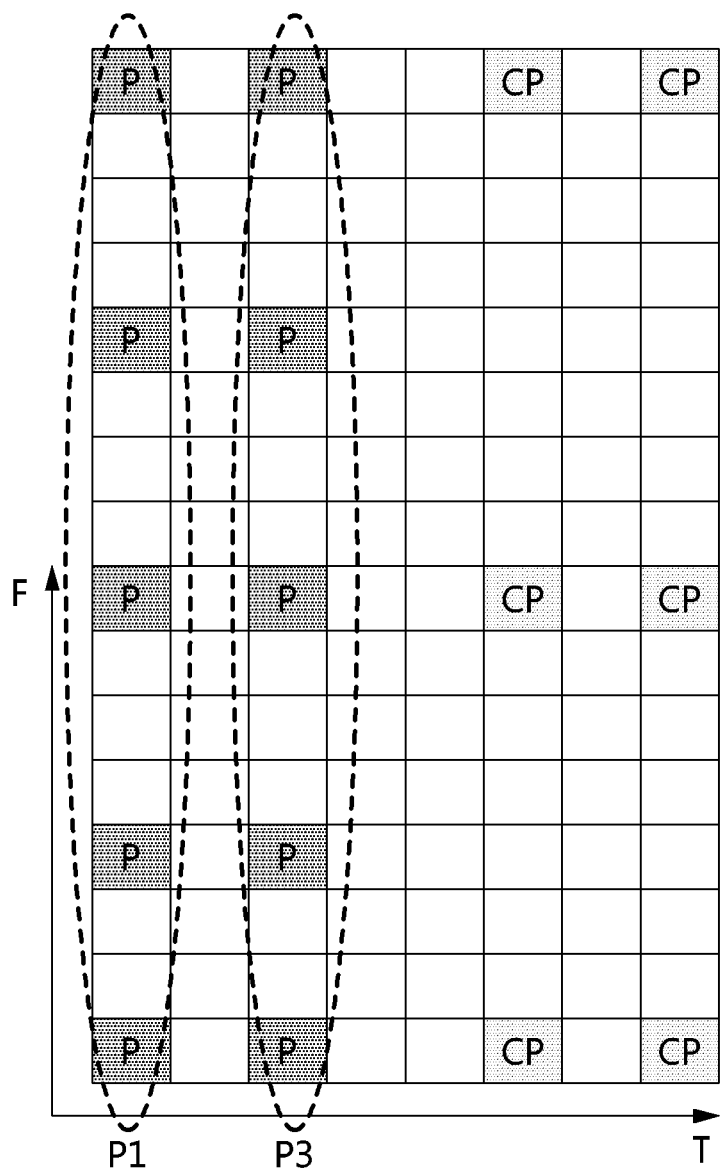
FIG. 16 is a diagram illustrating the arrangement of pilots in a pilot pattern according to an embodiment of the present invention.

FIG. 16 is a diagram illustrating the arrangement of pilots in a pilot pattern according to an embodiment of the present invention.

Referring to FIG. 16, the arrangement of pilots in pilot pattern 2 of a DOCSIS 3.1 upstream system according to an embodiment of the present invention can be seen.

Figure 17:
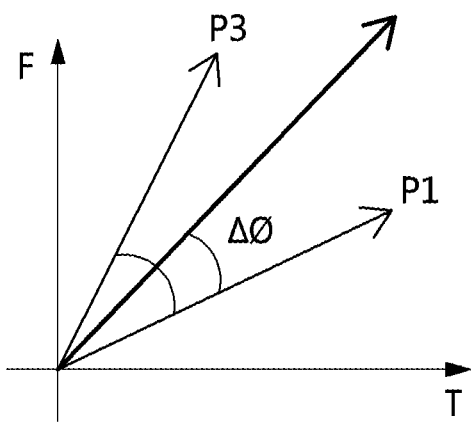
FIG. 17 is a graph illustrating a CFO compensation process in a frequency domain according to an embodiment of the present invention.

FIG. 17 is a graph illustrating a Carrier Frequency Offset (CFO) compensation process in a frequency domain according to an embodiment of the present invention.

Referring to FIG. 17, it can be seen that the process for compensating for a CFO in a frequency domain is illustrated.

The amount of frequency angular rotation between symbols in the frequency domain may be calculated using the above-described Equation (1).

Figure 18:
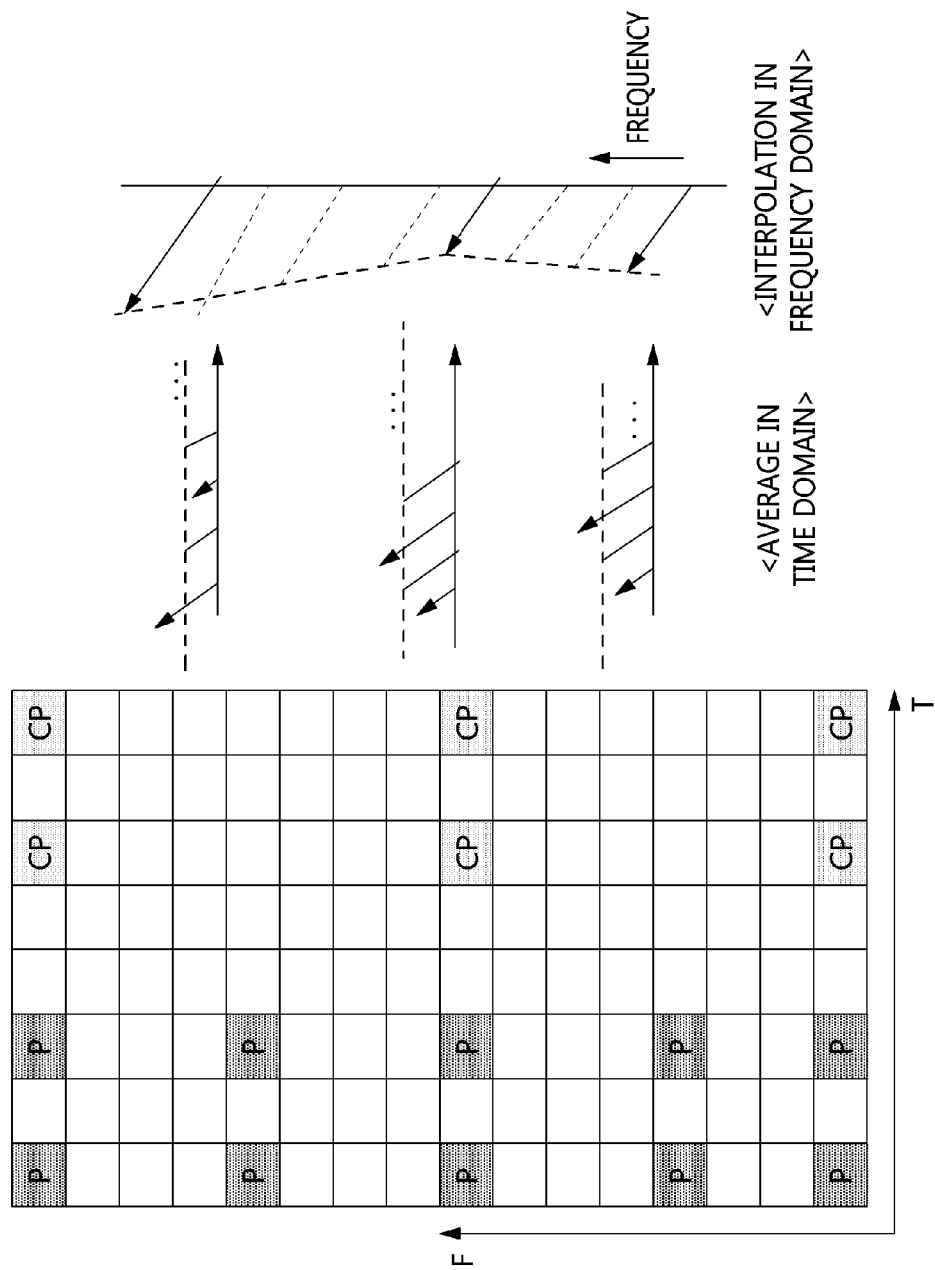
FIG. 18 is a diagram illustrating a channel estimation process according to an embodiment of the present invention.

FIG. 18 is a diagram illustrating a channel estimation process according to an embodiment of the present invention.

Referring to FIG. 18, illustrated is a process for obtaining the average of channel gains using only pilots, that is, P1 and P3 pilots, and applying the average to eight symbols in a time domain and for interpolating the channel gains calculated in the time domain and applying the interpolated value to a frequency domain.

Figure 19:
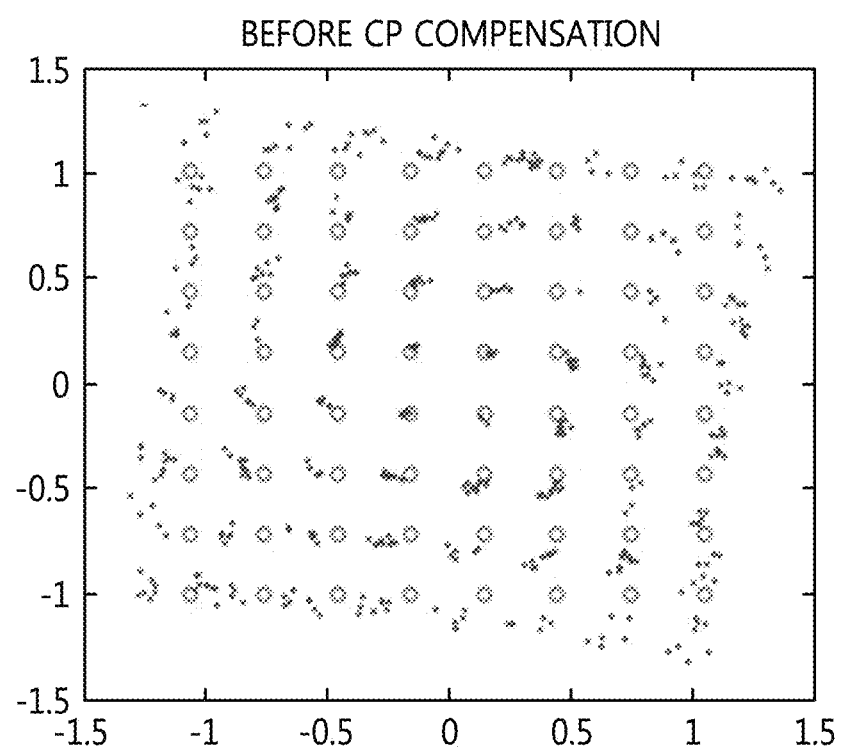
FIG. 19 is a constellation illustrating an input complementary pilot symbol according to an embodiment of the present invention.

FIG. 19 is a constellation illustrating an input complementary pilot symbol according to an embodiment of the present invention.

Referring to FIG. 19, input complementary pilot symbols according to an embodiment of the present invention are illustrated.

Figure 20:
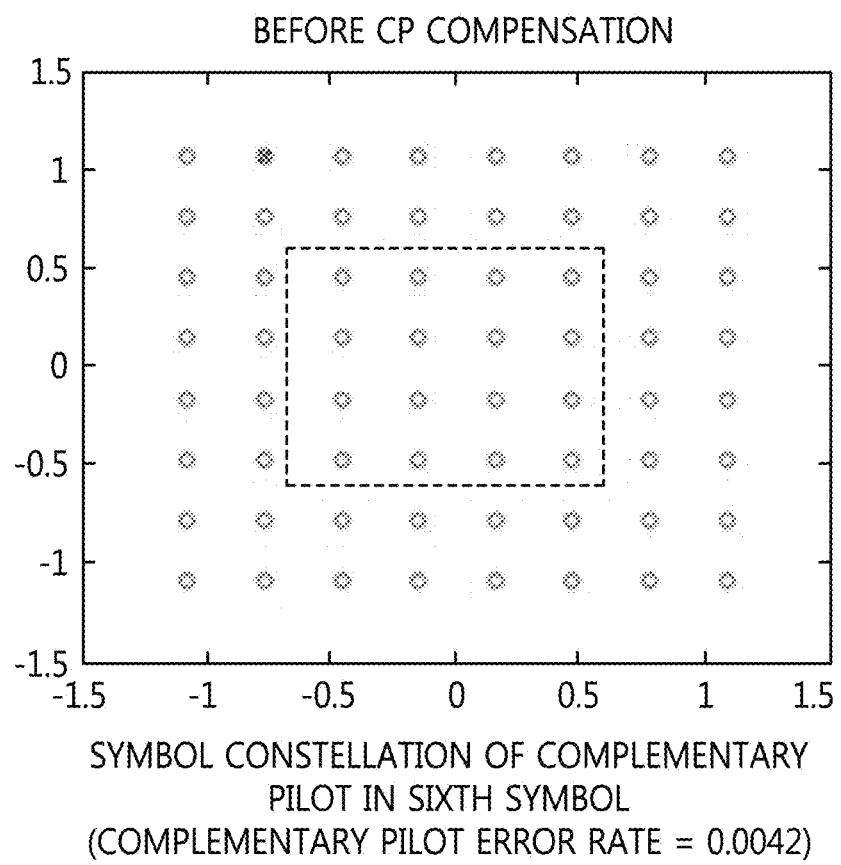
FIG. 20 is a constellation illustrating a symbol range for error compensation in a complementary pilot in a sixth symbol according to an embodiment of the present invention.
Figure 21:
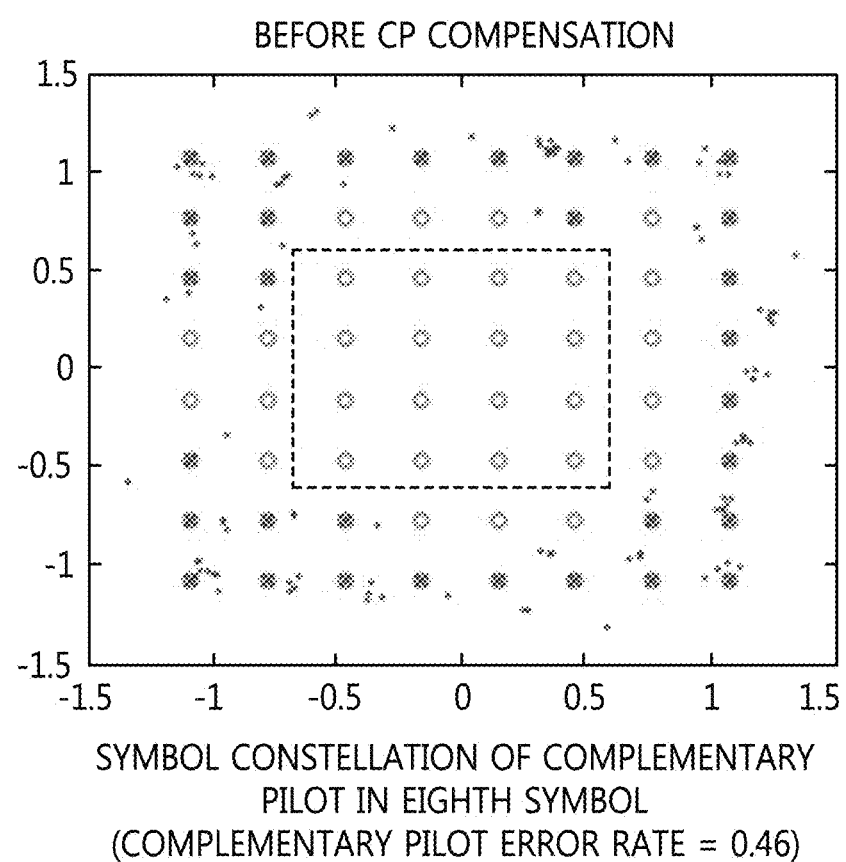
FIG. 21 is a constellation illustrating a symbol range for error compensation in a complementary pilot in an eighth symbol according to an embodiment of the present invention.

FIG. 20 is a constellation illustrating a symbol range for error compensation in a complementary pilot in a sixth symbol according to an embodiment of the present invention. FIG. 21 is a constellation illustrating a symbol range for error compensation in a complementary pilot in an eighth symbol according to an embodiment of the present invention.

Referring to FIGS. 20 and 21, it can be seen that the error rate of a complementary pilot in a sixth symbol is 0.0042 and that the error rate of a complementary pilot in an eighth symbol is 0.46 due to the influence of a sampling clock offset and a CFO corresponding to the results of detection. That is, the drawings show that a remarkably high error rate is exhibited in a high-order symbol.

In order to correct this error rate, the synchronization apparatus and method for the upstream system according to embodiments of the present invention may set a low-power symbol range (a rectangular range) in which errors do not occur in the constellations of the sixth symbol and the eighth symbol, and may extract compensation parameters based on the low-power symbol range.

Figure 22:
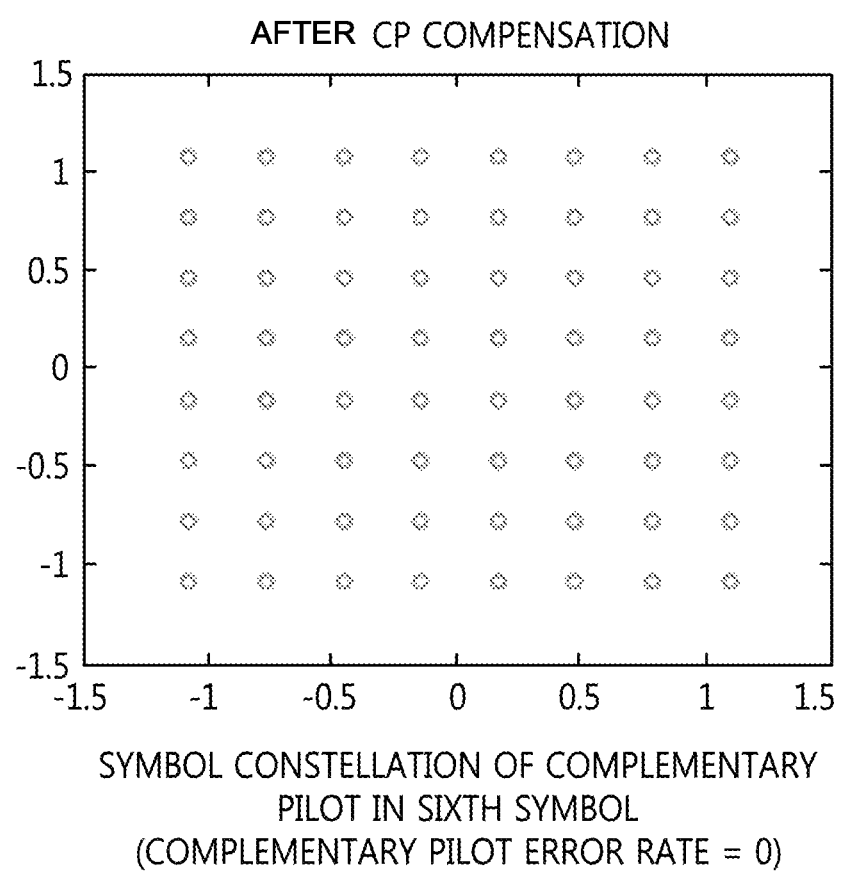
FIG. 22 is a constellation illustrating a complementary pilot in an error-compensated sixth symbol according to an embodiment of the present invention.
Figure 23:
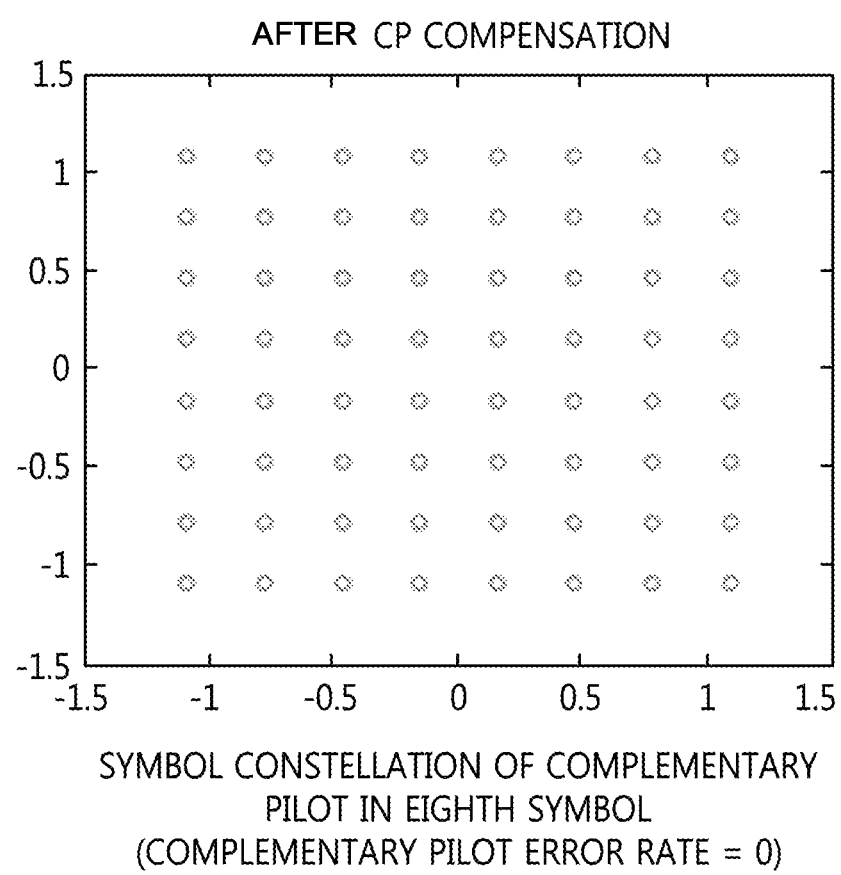
FIG. 23 is a constellation illustrating a complementary pilot in an error-compensated eighth symbol according to an embodiment of the present invention.

FIG. 22 is a constellation illustrating a complementary pilot in an error-compensated sixth symbol according to an embodiment of the present invention. FIG. 23 is a constellation illustrating a complementary pilot in an error-compensated eighth symbol according to an embodiment of the present invention.

Referring to FIGS. 22 and 23, it can be seen that, when complementary pilots are detected again after compensation parameters have been applied, the error rates of complementary pilots in sixth and eighth symbols are '0'. A complementary pilot error rate of '0' may mean that the complementary pilots in sixth and eighth symbols can be used as known signals (i.e., signals agreed upon between transmission and reception stages), such as pilots.

Figure 24:
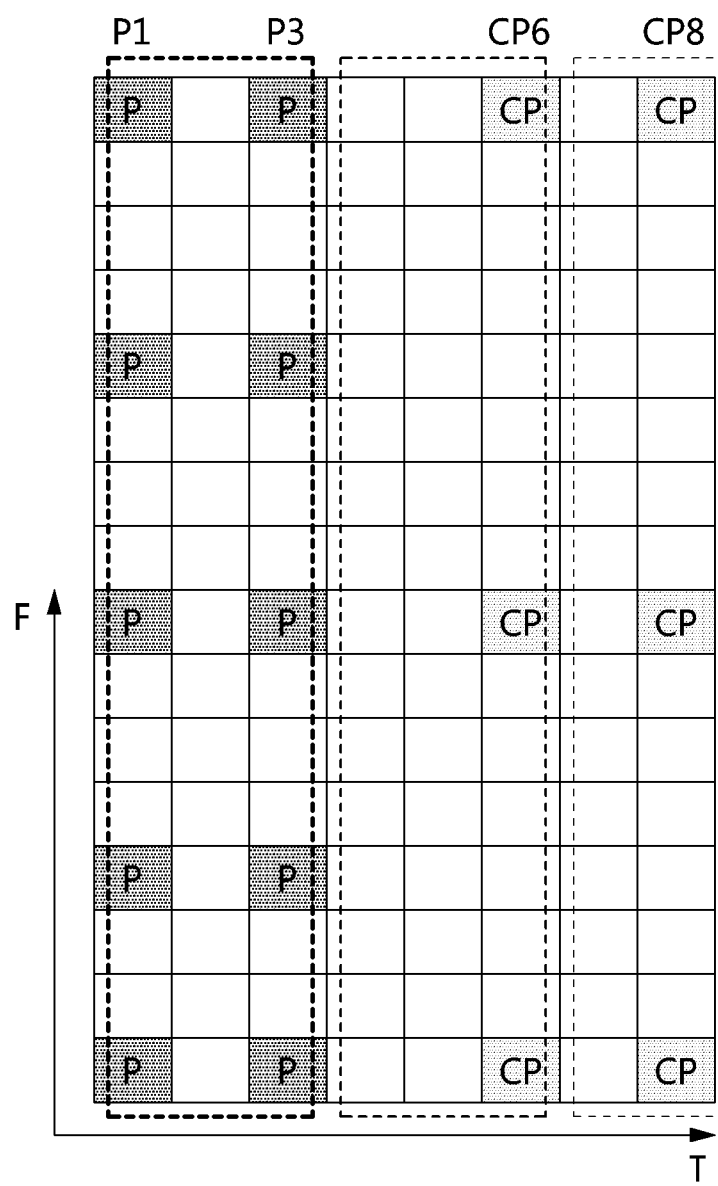
FIG. 24 is a diagram illustrating a channel estimation process using error-compensated complementary pilots according to an embodiment of the present invention.
Figure 25:
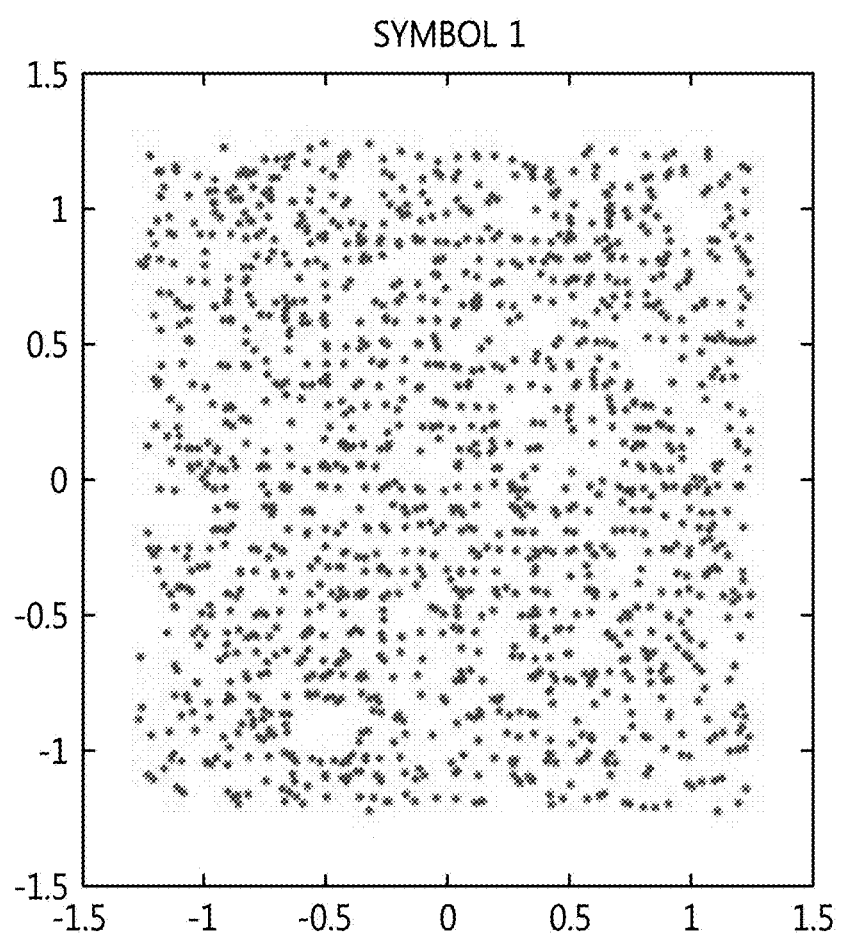
FIGS. 25 to 32 are constellations illustrating an error-compensated complementary pilot according to an embodiment of the present invention.
Figure 26:
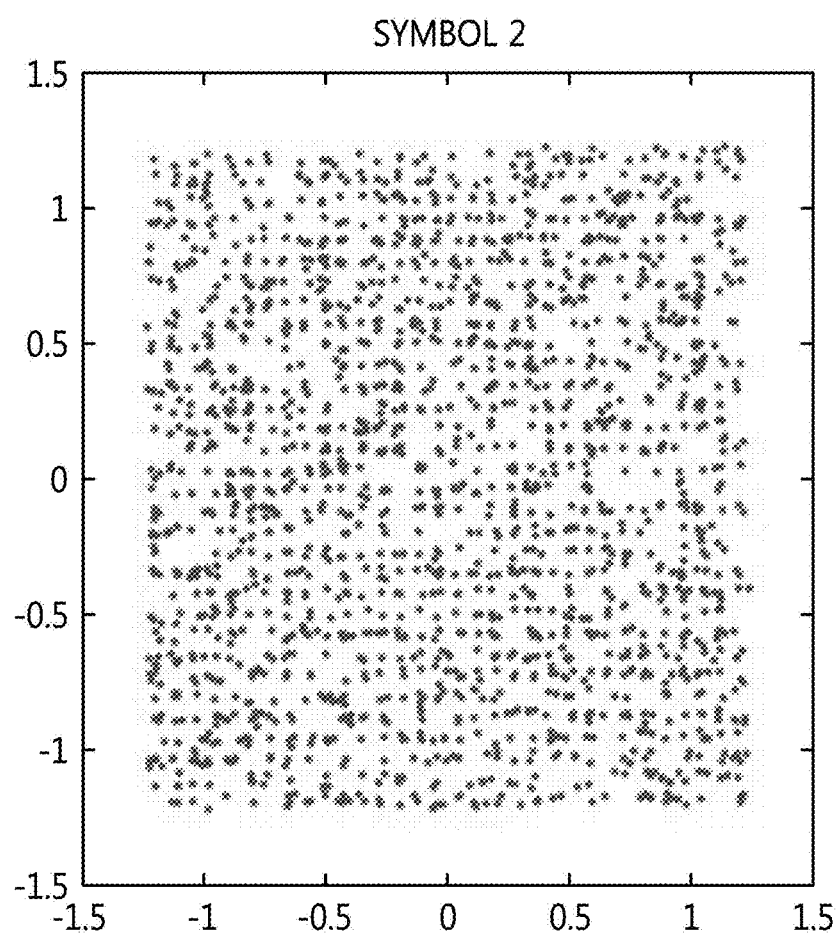
Figure 27:
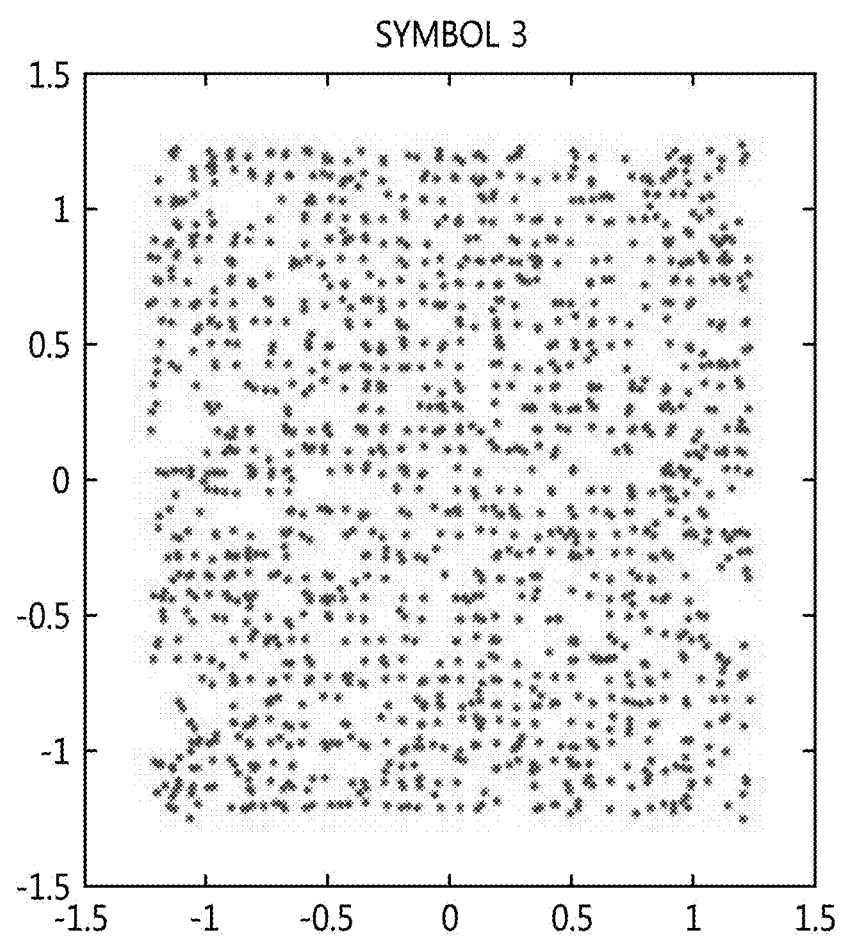
Figure 28:
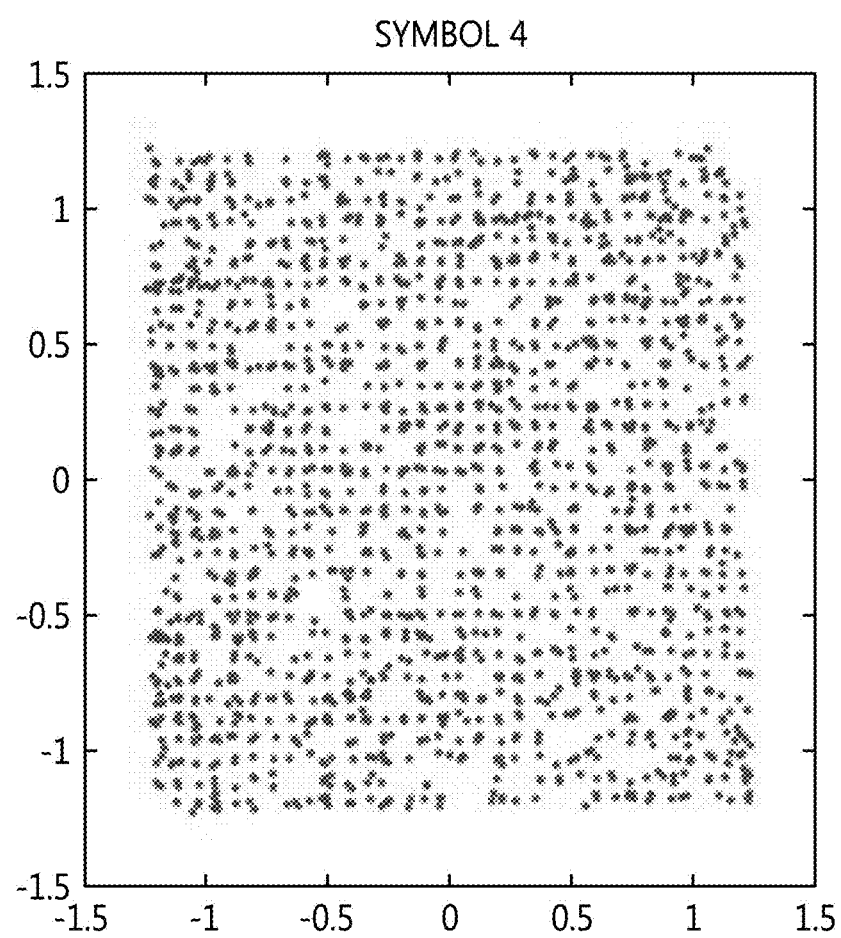
Figure 29:
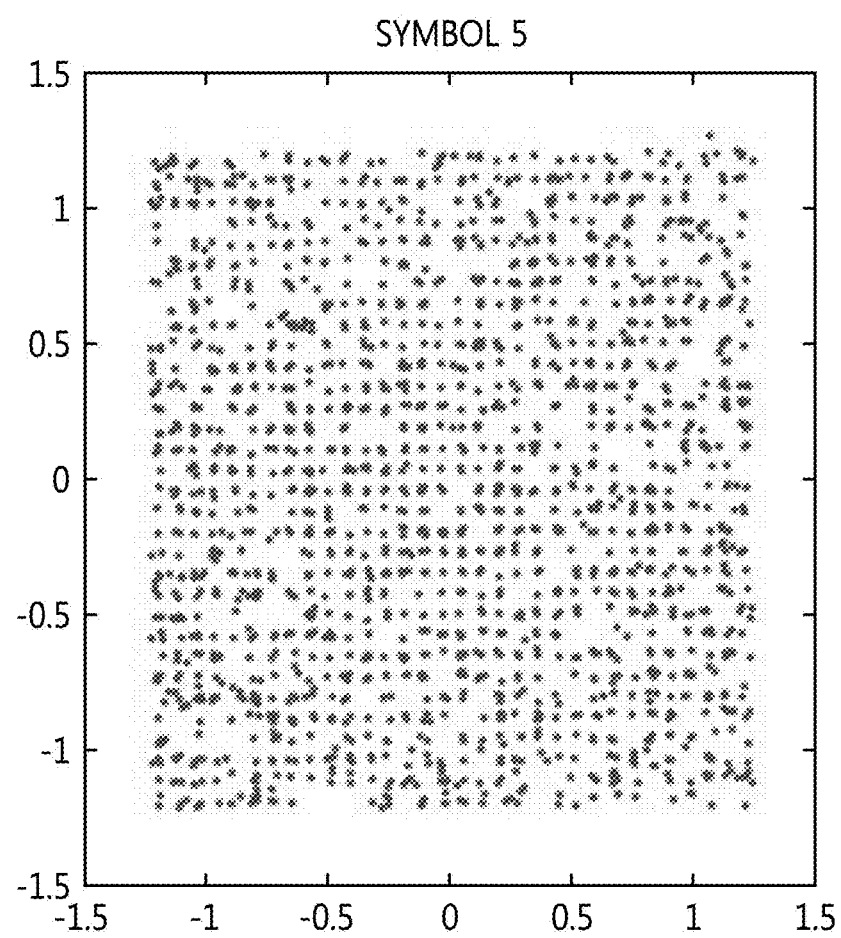
Figure 30:
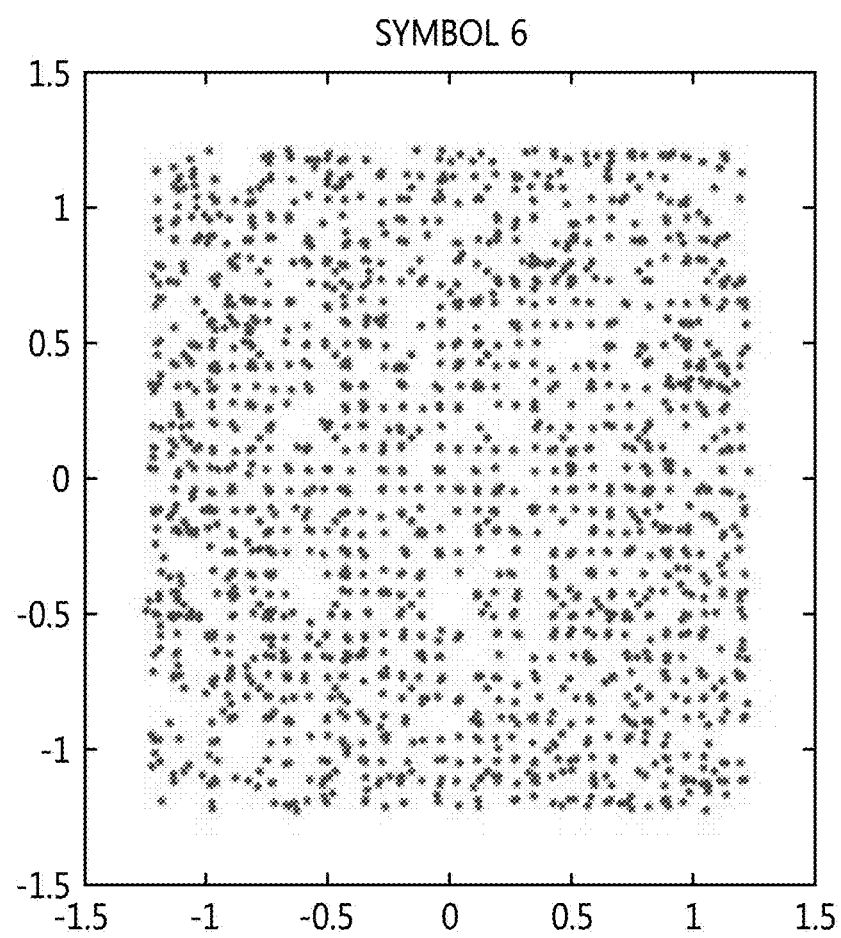
Figure 31:
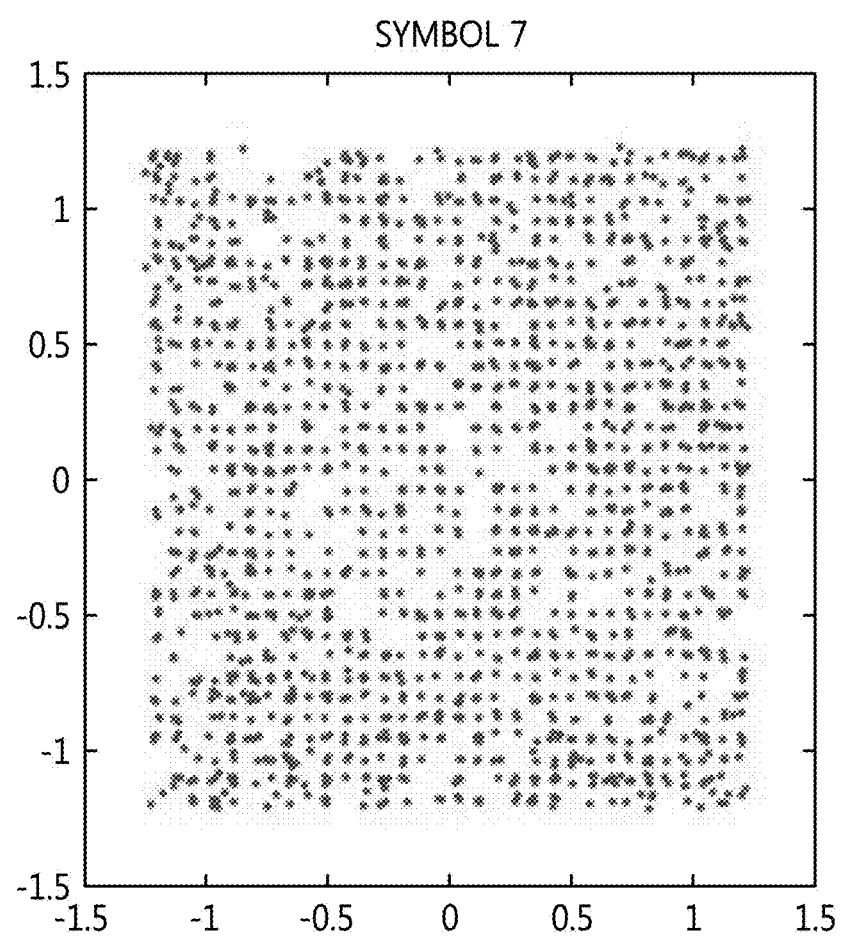
Figure 32:
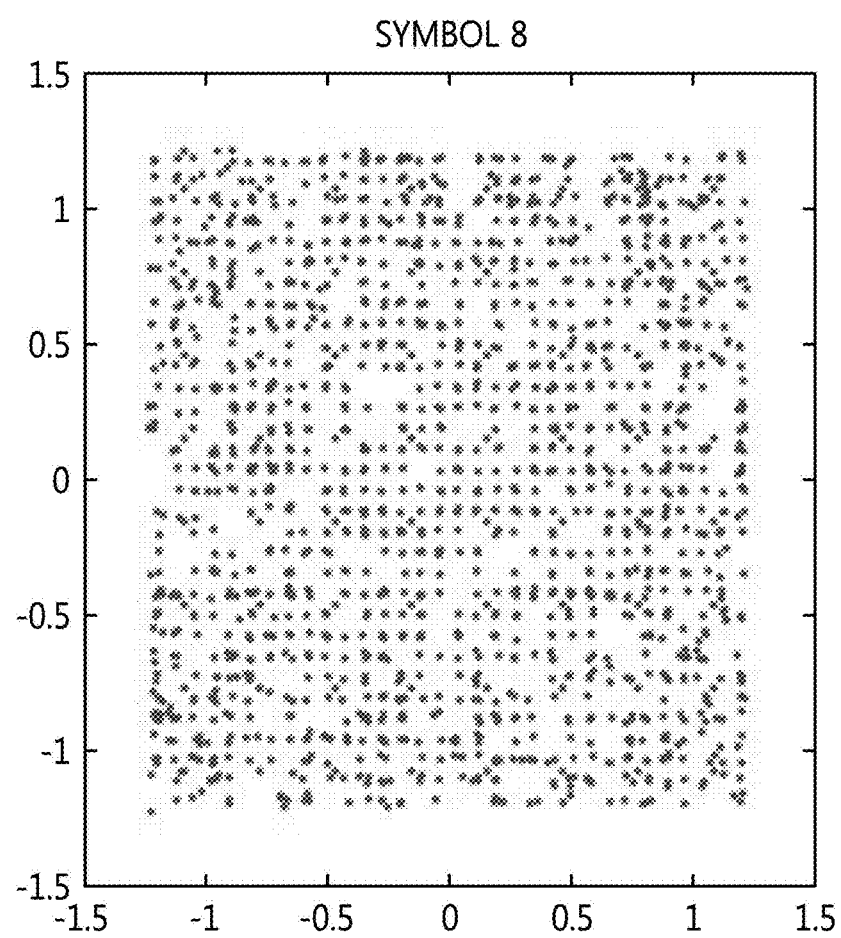

FIG. 24 is a diagram illustrating a channel estimation process using error-compensated complementary pilots according to an embodiment of the present invention.

Referring to FIG. 24, it can be seen that an embodiment of channel estimation and equalization using error-compensated complementary pilots is illustrated.

Here, the synchronization apparatus and method for the upstream system according to an embodiment of the present invention may obtain the average of channel gains in a time domain using pilots in first and third symbols indicated in the dashed-line rectangle, and may perform interpolation on the channel gains in a frequency domain. Since channel estimation values using only the pilots may be used without change, channel gain values stored in memory may be fetched and used without an operation procedure being performed in the channel estimation and equalization process using the complementary pilots. However, an operation procedure must be able to be performed on fourth to eighth symbols using newly detected complementary pilots.

In this case, the synchronization apparatus and method for the upstream system according to an embodiment of the present invention may calculate the channel gain of a block indicated by a dashed-line rectangle (fourth and sixth symbols) by obtaining a time domain average using a third pilot and a sixth complementary pilot and by obtaining a frequency domain average based on the time domain average.

At this time, the synchronization apparatus and method for a upstream system according to an embodiment of the present invention may calculate the channel gain of a block indicated by a black dashed-line rectangle (seventh and eighth symbols) by obtaining a time domain average using sixth and eighth complementary pilots and by obtaining a frequency domain average based on the time domain average.

FIGS. 25 to 32 are constellations illustrating error-compensated complementary pilots according to embodiment of the present invention.

Referring to FIGS. 25 to 32, it can be seen that the synchronization apparatus and method for a upstream system according to embodiments of the present invention may perform channel estimation and equalization based on pilots and perform channel estimation and equalization based on error-compensated complementary pilots. As a result, a sampling clock offset and a Carrier Frequency Offset (CFO) in the symbol constellations illustrated in FIGS. 3 to 10 may be compensated for, and thus symbol constellations illustrated in FIGS. 25 to 32 may be obtained.

Figure 33:
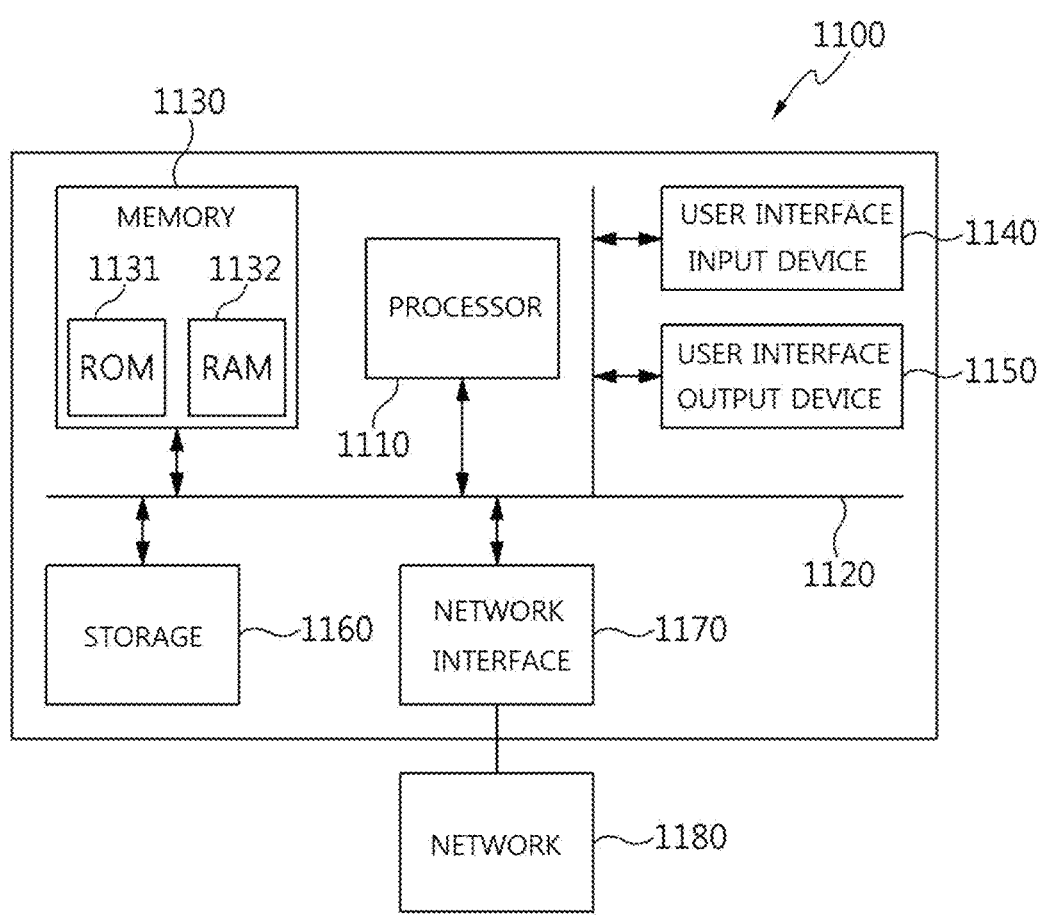
FIG. 33 is a diagram illustrating a computer system according to an embodiment of the present invention.

FIG. 33 is a diagram illustrating a computer system according to an embodiment of the present invention.

Referring to FIG. 33, a synchronization apparatus for a upstream system according to an embodiment of the present invention may be implemented in a computer system 1100, such as a computer-readable storage medium. As illustrated in FIG. 33, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The synchronization apparatus for the upstream system according to an embodiment of the present invention may include one or more processors 1110, and execution memory 1130 for storing at least one program executed by the one or more processors 1110. Here, the at least one program is configured to receive a signal, calculate a first channel estimation value for the received signal using a predefined pilot, and calculate a second channel estimation value using a predefined complementary pilot and the first channel estimation value.

The at least one program may be configured to extract compensation parameters from a preset symbol range in a symbol constellation from which the predefined complementary pilot is extracted.

The at least one program may be configured to extract compensation parameters for at least two complementary pilots from preset symbol ranges in the symbol constellations of the at least two complementary pilots.

The at least one program may be configured to compensate for errors in the complementary pilots using the compensation parameters.

The at least one program may calculate a second channel estimation value using the error-compensated complementary pilots, the predefined pilot, and the first channel estimation value, and may perform channel equalization based on the second channel estimation value.

The present invention may provide synchronization and channel equalization efficient for a DOCSIS 3.1 upstream system.

Further, the present invention may effectively eliminate frequency and phase offsets attributable to the sampling clock offset of a DOCSIS 3.1 upstream system.

As described above, in the synchronization apparatus and method for a upstream system according to the present invention, the configurations and schemes in the above-described embodiments are not limitedly applied, and some or all of the above embodiments can be selectively combined and configured such that various modifications are possible.

What is claimed is:

1. A synchronization apparatus for an upstream system, comprising:
   one or more processors; and
   an execution memory for storing at least one program that is executed by the one or more processors,
   wherein the at least one program when executed causes the one or more processors to:
   receive a signal and calculate a first channel estimation value for the received signal using a predefined pilot, and
   calculate a second channel estimation value using a predefined complementary pilot and the first channel estimation value,
   wherein the at least one program when executed further causes the one or more processors to extract a compensation parameter from a preset symbol range in a symbol constellation from which the predefined complementary pilot is extracted.

2. The synchronization apparatus of claim 1, wherein the at least one program when executed further causes the one or more processors to extract respective compensation parameters for at least two complementary pilots from preset symbol ranges in symbol constellations of the at least two complementary pilots.

3. The synchronization apparatus of claim 1, wherein the at least one program when executed further causes the one or more processors to compensate for an error in the predefined complementary pilot using the compensation parameter.

4. The synchronization apparatus of claim 3, wherein the at least one program when executed further causes the one or more processors to calculate the second channel estimation value alternatively using an error-compensated complementary pilot, the predefined pilot, and the first channel estimation value, and to perform channel equalization based on the second channel estimation value.

5. A synchronization method for an upstream system, the synchronization method being performed using a synchronization apparatus for the upstream system, the synchronization method comprising:
   receiving a signal and calculating a first channel estimation value for the received signal using a predefined pilot; and
   calculating a second channel estimation value using a predefined complementary pilot and the first channel estimation value,
   wherein calculating the second channel estimation value further comprises extracting a compensation parameter from a preset symbol range in a symbol constellation from which the predefined complementary pilot is extracted.

6. The synchronization method of claim 5, wherein calculating the second channel estimation value further comprises extracting respective compensation parameters for at least two complementary pilots from preset symbol ranges in symbol constellations of the at least two complementary pilots.

7. The synchronization method of claim 6, wherein calculating the second channel estimation value further comprises compensating for an error in each of the at least two complementary pilots using the respective compensation parameters.

8. The synchronization method of claim 7, wherein calculating the second channel estimation value further comprises calculating the second channel estimation value alternatively using error-compensated complementary pilots, the predefined pilot, and the first channel estimation value, and to perform channel equalization based on the second channel estimation value.

* * * * *